United States Patent
Ko et al.

(10) Patent No.: US 11,027,765 B2
(45) Date of Patent: Jun. 8, 2021

(54) STEERING WHEEL FOR VEHICLE

(71) Applicant: HYUNDAI MOBIS CO., LTD., Seoul (KR)

(72) Inventors: Seok Hoon Ko, Yongin-si (KR); Do Hyoung Kim, Yongin-si (KR); Hae Kwon Park, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 16/918,693

(22) Filed: Jul. 1, 2020

(65) Prior Publication Data
US 2021/0001915 A1    Jan. 7, 2021

(30) Foreign Application Priority Data

Jul. 2, 2019   (KR) .................. 10-2019-0079190
Jul. 2, 2019   (KR) .................. 10-2019-0079192
Aug. 8, 2019   (KR) .................. 10-2019-0096546

(51) Int. Cl.
*B62D 1/11*      (2006.01)

(52) U.S. Cl.
CPC ..................... *B62D 1/11* (2013.01)

(58) Field of Classification Search
CPC ......................................... B62D 1/11
See application file for complete search history.

(56) References Cited

U.S. PATENT DOCUMENTS

| | | | |
|---|---|---|---|
| 2009/0218739 A1* | 9/2009 | Terada | B62D 7/222 267/2 |
| 2013/0239739 A1* | 9/2013 | Miyahara | B60R 21/2037 74/552 |
| 2017/0072985 A1* | 3/2017 | Ishii | B60R 21/2037 |

* cited by examiner

*Primary Examiner* — Vicky A Johnson
(74) *Attorney, Agent, or Firm* — DLA Piper LLP (US)

(57) ABSTRACT

A steering wheel for a vehicle may include: a damper part installed in a connection hole of a horn plate, and formed of an elastic material; a horn bolt part fixed to a hub part through the damper part, and configured to guide movement of the horn plate; a damper housing located between the damper part and the horn bolt part, and moved with the damper part; and a horn spring configured to support the damper housing, and having elasticity.

16 Claims, 32 Drawing Sheets

STEERING WHEEL FOR VEHICLE

CROSS-REFERENCE TO RELATED APPLICATION

This application claims priority from and the benefit of Korean Patent Application No. 10-2019-0079192, 10-2019-0079190 and 10-2019-0096546, filed on Jul. 2, Jul. 2 and Aug. 8, 2019, respectively, which are hereby incorporated by reference for all purposes as if set forth herein.

BACKGROUND

Field

Exemplary embodiments of the present disclosure relate to a steering wheel for a vehicle, and more particularly, to a steering wheel for a vehicle, which can prevent damage to a damper and improve the durability of the damper.

Discussion of the Background

In general, a steering wheel refers to a circular steering apparatus which is used to change the traveling direction of a vehicle by moving the wheels of the vehicle from side to side. The steering wheel is constituted by a ring-shaped rim held in a driver's hand, a hub positioned in the center of the rim and a spoke connecting the hub and the rim.

An airbag module is installed in the hub, and a horn plate for supporting the airbag module is positioned in the hub. As a contact is achieved by the movement of the horn plate in a top-to-bottom direction, a horn is operated.

In order to improve the vibration quality of the steering wheel, the airbag module may be utilized as a damping weight. A damper is mounted on the horn plate mounted in the steering wheel. Such a damper is moved along a horn bolt.

In the related art, when a steel part positioned around the damper is brought into contact with the damper, the damper is damaged to degrade the durability of the damper. Therefore, there is a need for a structure capable of solving the problem.

SUMMARY

Various embodiments are directed to a steering wheel for a vehicle, which can prevent damage to a damper and improve the durability of the damper.

Also, various embodiments are directed to a steering wheel for a vehicle, which can prevent distortion in a damper connected to a horn plate and a change in natural frequency of the damper.

Also, various embodiments are directed to a steering wheel for a vehicle, which can reduce surface contact between a damper connected to a horn plate and an adjacent part, thereby improving the durability of the damper and preventing distortion in the damper and a change in natural frequency of the damper.

In an embodiment, a steering wheel for a vehicle may include: a damper part installed in a connection hole of a horn plate, and formed of an elastic material; a horn bolt part fixed to a hub part through the damper part, and configured to guide movement of the horn plate; a damper housing located between the damper part and the horn bolt part, and moved with the damper part; and a horn spring configured to support the damper housing, and having elasticity.

The damper part may include: an inner member installed in a ring shape while abutting on the inside of the damper housing; an outer member located outside the inner member, and installed in a shape to cover the horn plate; and a connection member configured to connect the inner member and the outer member.

The horn bolt part may include: a head member located on the top of the horn plate; a bolt body extended from the head member through the inside of the damper housing; and a fastening body extended from the bolt body and fixed to the hub part.

The damper housing may include: a first damper housing extended from the top of the horn plate to the bottom of the damper part; and a second damper housing located under the damper part, fastened to the first damper housing, and supported by the horn spring.

The first damper housing may include: a housing head located between the damper part and the head member; a first housing body extended from the housing head, and located between the damper part and the bolt body; and a fixing body extended from the first housing body, and having a screw thread formed on the outside thereof such that the second damper housing is fastened to the screw thread.

The top of the housing head may support the head member, and the bottom of the housing head may abut on the damper part.

The second damper housing may include: a second housing body fastened to the outside of the fixing body; and a support member extended outward from the second housing body, and supported by the horn spring.

The first damper housing may further include a release prevention protrusion protruding from the bottom surface of the fixing body, facing the second housing body, and inserted and locked into the second housing body.

The release prevention protrusion may have has a cross-section formed in a right-angled triangle shape, and a plurality of release prevention protrusions may be installed on a bottom surface in a circumferential direction.

In an embodiment, a steering wheel for a vehicle may include: a damper part installed in a connection hole of a horn plate, and form of an elastic material; a horn bolt part fixed to a hub part through the damper part, and configured to guide movement of the horn plate; a first damper housing located between the damper part and the horn bolt part, and extended from the top of the horn plate to the bottom of the damper part; a second damper housing located under the damper part, fastened to the first damper housing, and supported by a horn spring; and the horn spring configured to support the second damper housing, and having elasticity.

The first damper housing may include: a housing head located between the damper part and a head member of the horn bolt part; a first housing body extended from the housing head, and located between the damper part and the horn bolt part; and a fixing body extended from the first housing body, and having a screw thread formed on the outside thereof such that the second damper housing is fastened to the screw thread; and a release prevention protrusion protruding from the bottom surface of the fixing body, and inserted and locked into the second damper housing.

In an embodiment, a steering wheel for a vehicle may include: a damper part installed in a connection hole of a horn plate, and formed of an elastic material; a horn bolt part fixed to a hub part through the damper part, and configured to guide movement of the horn plate; a damper housing located between the damper part and the horn bolt part, and moved with the damper part; and a contact plate part installed between the damper housing and the damper part.

The damper part may include: an inner member installed in a ring shape while abutting on the inside of the damper housing; an outer member located outside the inner member, and installed in a shape to cover the horn plate; and a connection member configured to connect the inner member and the outer member.

The damper part may further include a fixing protrusion extended from the outer member and inserted and locked into a fixing hole of the horn plate.

The horn bolt part may include: a head member located on the top of the horn plate; a bolt body extended from the head member through the inside of the damper housing; and a fastening body extended from the bolt body and fixed to the hub part.

The damper housing may include: a first damper housing extended from the top of the horn plate to the bottom of the damper part; and a second damper housing located under the damper part, fastened to the first damper housing, and supported by a horn spring.

The first damper housing may include: a housing mead located over the damper part and having a larger outer diameter than the inner diameter of the damper part; a first housing body extended from the housing head and located between the damper part and the horn bolt part; and a fixing body extended from the first housing body and having a screw thread formed on the outside thereof such that the second damper housing is fastened to the screw thread.

The second damper housing may include: a second housing body fastened to the outside of the fixing body; and a support member extended outward from the second housing body and supported by the horn spring.

The contact plate may include: a first contact plate part installed between the top of the damper part and the first damper housing; and a second contact plate part installed between the bottom of the damper part and the second damper housing.

The first contact plate part may include a first body configured to support the head member of the horn bolt part; a first inner protrusion protruding laterally from the first body and configured to support the first damper housing; and a first contact protrusion extended downward from the first body and abutting on the damper part.

In an embodiment, a steering wheel for a vehicle may include: a damper part installed in a connection hole of a horn plate, and formed of an elastic material; a horn bolt part fixed to a hub part through the damper part, and configured to guide movement of the horn plate; a damper housing located between the damper part and the horn bolt part, and moved with the damper part; a first contact plate part installed between the top of the damper part and the damper housing; and a second contact plate part installed between the bottom of the damper part and the damper housing.

The damper part may include: a damper body installed in such a shape that the inside thereof abuts on the damper housing and the outside thereof covers the horn plate; and a fixing protrusion extended from the damper body, and inserted and locked into a fixing hole of the horn plate, such that the first and second contact plate parts abut on the outside thereof.

The damper housing may include: a first damper housing extended from the top of the first contact plate to the bottom of the damper part; and a second damper housing located under the second contact plate part, fastened to the first damper housing, and supported by the horn spring.

In an embodiment, a steering wheel for a vehicle may include a damper part installed in a connection hole of a horn plate, and formed of an elastic material; a horn bolt part fixed to a hub part through the damper part, and configured to guide movement of the horn plate; a first damper housing located between the damper part and the horn bolt part, and extended from the top of the horn plate to the bottom of the damper part; a second damper housing located under the damper part, fastened to the first damper housing, and supported by a horn spring; a first contact plate part installed between the top of the damper part and the first damper housing; and a second contact plate part installed between the bottom of the damper part and the second damper housing.

The damper part may include: a damper body installed in such a shape that the inside thereof abuts on the first damper housing and the outside thereof covers the horn plate; and a fixing protrusion extended from the damper body, and inserted and locked into a fixing hole of the horn plate, such that the first and second contact plate parts abut on the outside thereof.

The plurality of fixing protrusions may be installed along the circumferential surface of the damper body.

The damper body may include: an inner member installed in a ring shape while abutting on the inside of the damper housing, an outer member located outside the inner member, installed in a shape to cover the horn plate, and connected to the fixing protrusion, and a connection member connecting the inner member and the outer member.

The horn bolt part may include: a head member located over the horn plate, a bolt body extended from the head member, and passed through the inside of the damper housing; and a fastening body extended from the bolt body and fixed to the hub part.

The first damper housing may include: a housing head located over the damper part and having a larger diameter than the inner diameter than the damper part; a first housing body extended from the housing head and located between the damper part and the horn bolt part; and a fixing body extended from the first housing body and having a screw thread formed on the outside thereof such that the second damper housing is fastened to the screw thread.

The second damper housing may include a second housing body fastened to the outside of the fixing body; and a support member extended outward from the second housing body and supported by the horn spring.

The first contact plate part may include a first body configured to support the head member of the horn bolt part; a first inner protrusion protruding laterally from the first body and supporting the first damper housing; and a first contact protrusion extended downward from the first body and abutting on the damper part.

The first contact protrusion may be a plurality of protrusions protruding in the circumferential direction along the bottom surface of the first body or a protrusion protruding in a ring shape.

The second contact plate part may include: a second body positioned under the damper part; a second inner protrusion protruding laterally from the second body and supported by the horn spring; and a second contact protrusion extended upward from the second body and abutting on the damper part.

The second contact protrusion may be a plurality of protrusions protruding in the circumferential direction along the top surface of the second body or a protrusion protruding in a ring shape.

In accordance with the embodiments of the present disclosure, since the damper housing is installed between the damper part and the horn bolt part, it is possible to prevent damage which occurs while the damper part formed of an elastic material abuts on the horn bolt part formed of steel.

Furthermore, since the horn bolt part and the damper part are spaced apart from each other, a change in natural frequency of the damper part can be prevented, and the operation of the horn can be accurately operated to improve the operation reliability.

Furthermore, since the second damper housing is screwed to the first damper housing, it is possible to reduce the time and cost required for the coupling operation and the maintenance operation.

Furthermore, the damper part is not brought in contact with the contact plate part in a main vibration region of the damper part, but brought in contact with the contact plate part only in a non-main vibration region thereof. Therefore, it is possible to prevent a change in natural frequency of the damper part.

Furthermore, since the rotation of the damper housing is not transferred to the contact plate part, distortion in the damper part may be prevented to improve the durability of the damper part.

Furthermore, since the contact plate part abuts on the head member of the horn bolt part before the damper housing, noise can be reduced.

Furthermore, since only the first and second contact protrusions abut the top and bottom of the damper part, respectively, the contacts between the damper part and the neighboring parts at the top and bottom thereof can be minimized to improve the durability of the damper part.

The damper part is not brought into contact with the contact plate part in the main vibration region of the damper part, but brought into contact with the contact plate part only in the non-main vibration region. Therefore, it is possible to prevent a change in natural frequency of the damper part.

Furthermore, since the rotation of the damper housing is not transferred to the contact plate part, distortion in the damper part may be prevented to improve the durability of the damper part.

Furthermore, since the contact plate part abuts on the head member of the horn bolt part before the damper housing, noise can be reduced.

DETAILED DESCRIPTION OF THE ILLUSTRATED EMBODIMENTS

Hereinafter, a steering wheel for a vehicle will be described below with reference to the accompanying drawings through various exemplary embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
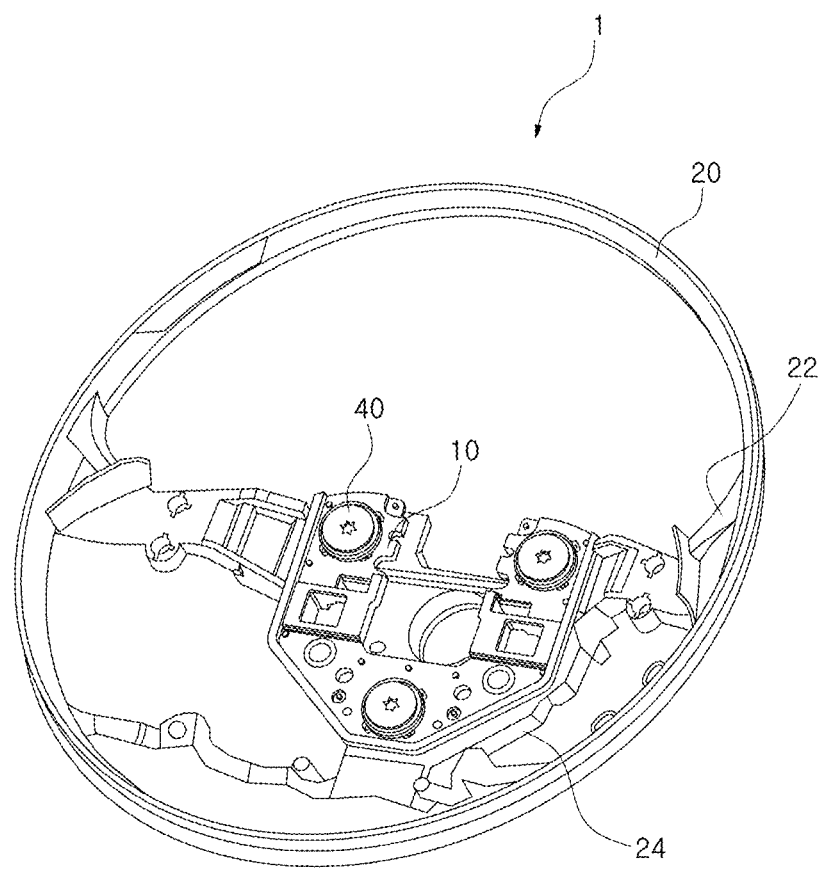
FIG. 1 is a perspective view schematically illustrating a structure of a steering wheel for a vehicle in accordance with an embodiment of the present disclosure.
Figure 2:
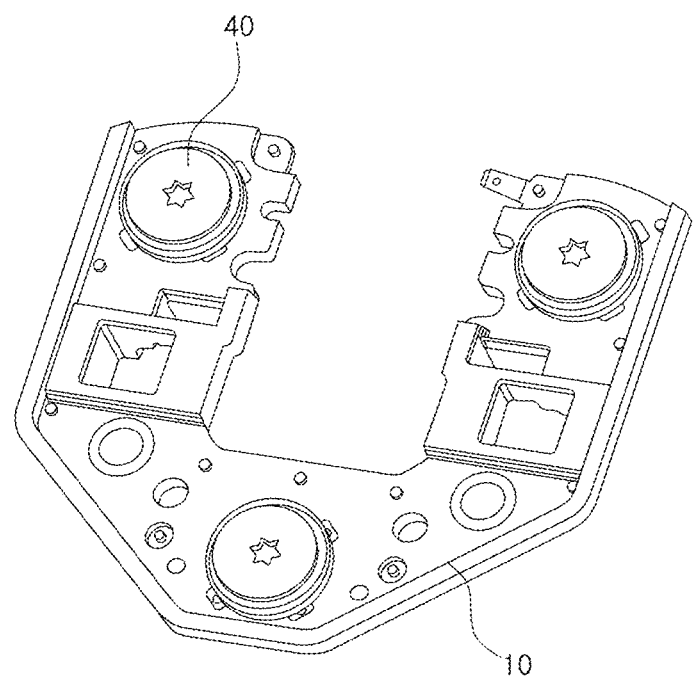
FIG. 2 is a perspective view illustrating that a horn bolt part is installed on a horn plate in accordance with the embodiment of the present disclosure.
Figure 3:
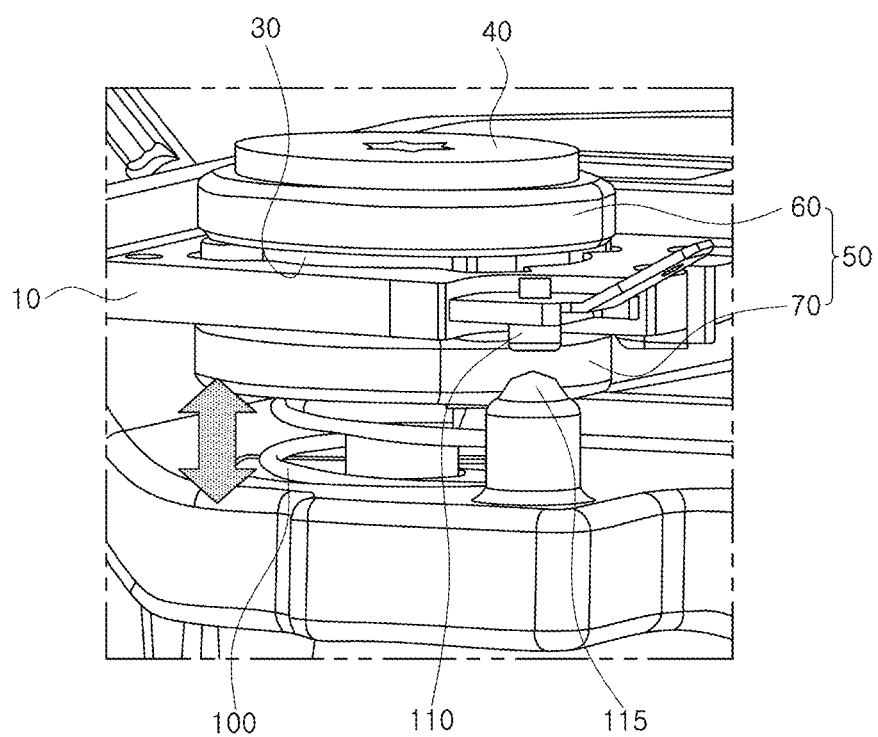
FIG. 3 is a perspective view illustrating a first contact and a second contact in accordance with the embodiment of the present disclosure.
Figure 4:
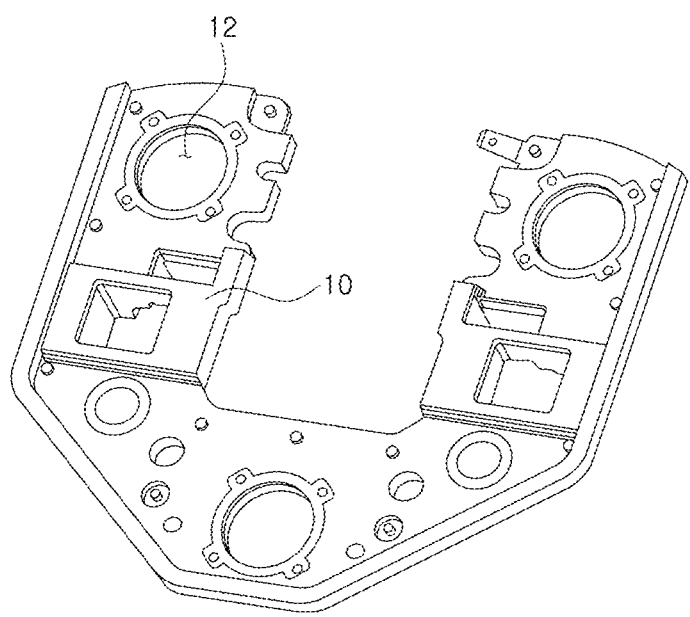
FIG. 4 is a perspective view illustrating the horn plate in accordance with the embodiment of the present disclosure.
Figure 5:
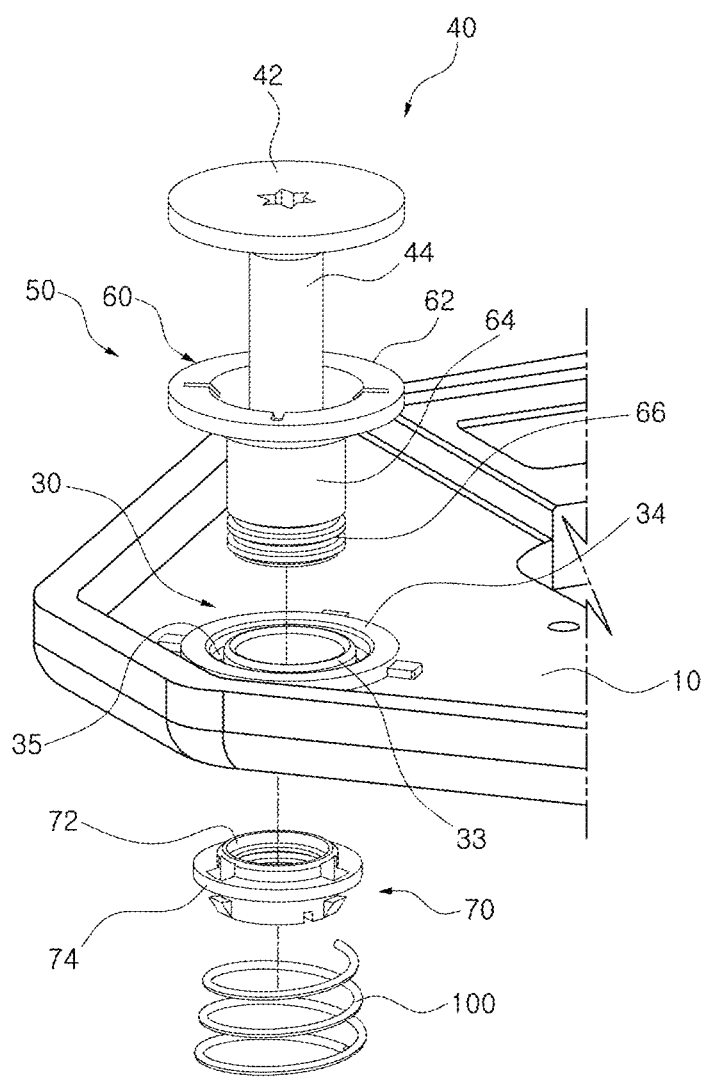
FIG. 5 is an exploded perspective view illustrating main parts of the steering wheel for a vehicle in accordance with the embodiment of the present disclosure.
Figure 6:
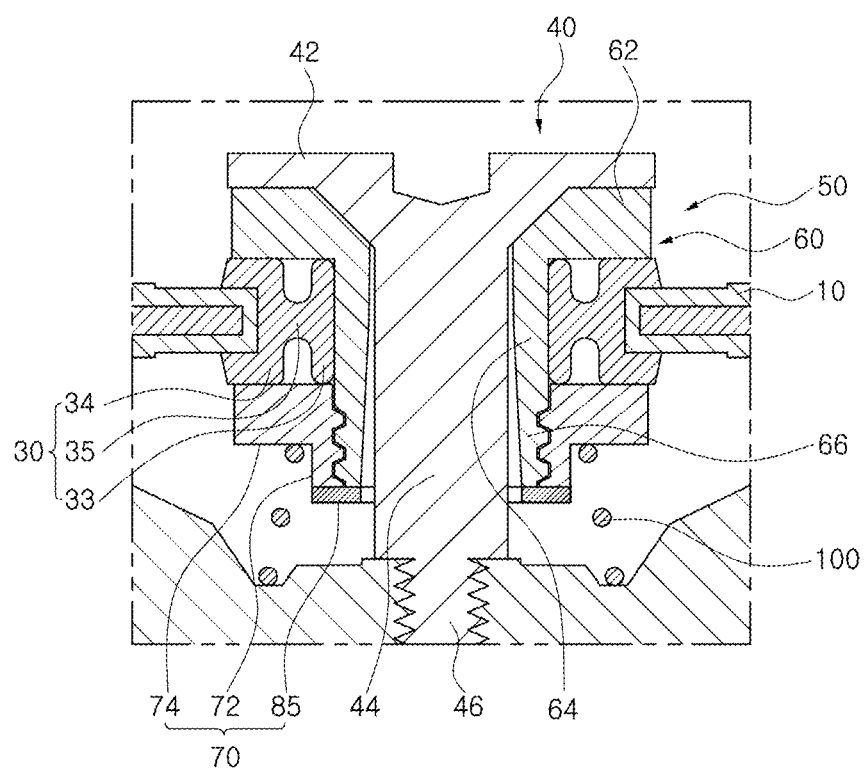
FIG. 6 is a cross-sectional view illustrating that a damper part in accordance with the embodiment of the present disclosure is installed.
Figure 7:
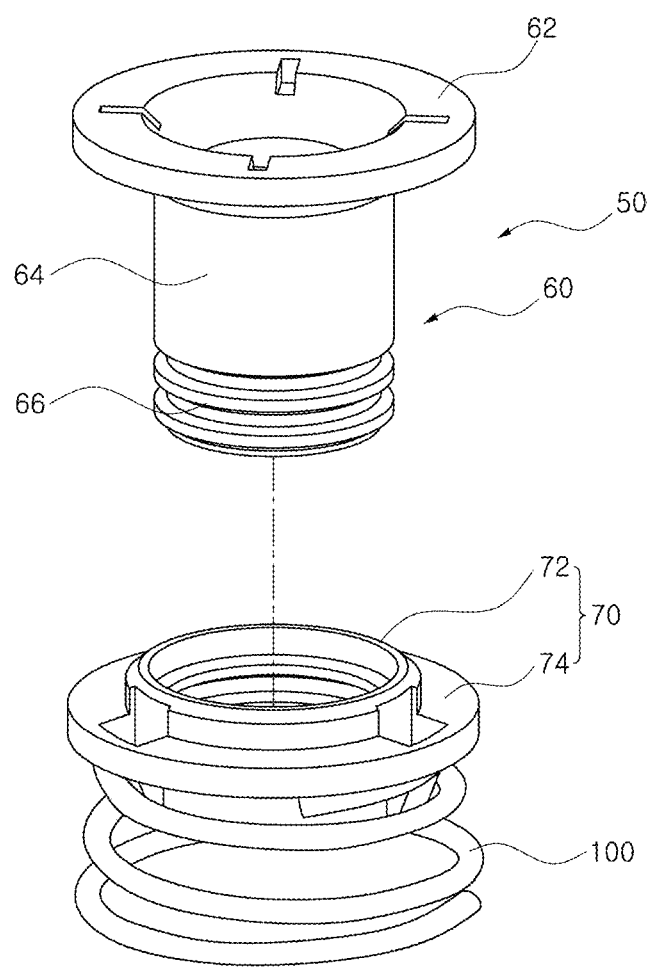
FIG. 7 is a perspective view illustrating that a first damper housing in accordance with the embodiment of the present disclosure is separated from a second damper housing.
Figure 8:
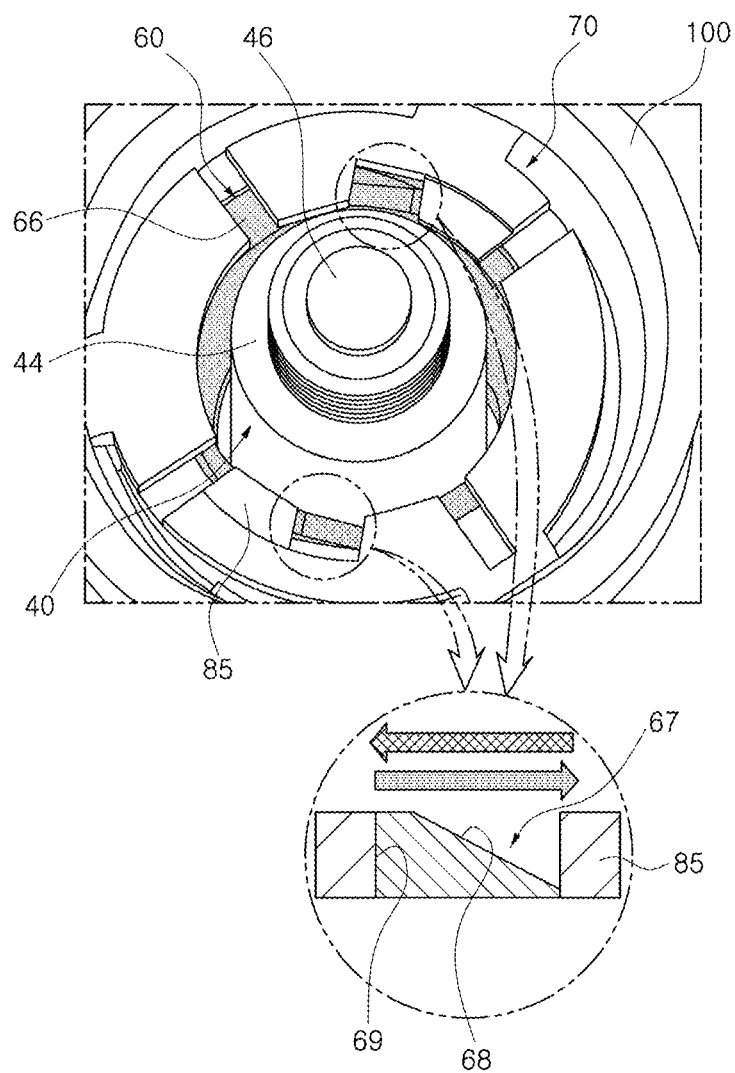
FIG. 8 is a perspective view illustrating that a release prevention protrusion in accordance with the embodiment of the present disclosure is inserted and locked to the second damper housing.

FIG. 1 is a perspective view schematically illustrating a structure of a steering wheel for a vehicle in accordance with an embodiment of the present disclosure, FIG. 2 is a perspective view illustrating that a horn bolt part is installed on a horn plate in accordance with the embodiment of the present disclosure, FIG. 3 is a perspective view illustrating a first contact and a second contact in accordance with the embodiment of the present disclosure, FIG. 4 is a perspective view illustrating the horn plate in accordance with the embodiment of the present disclosure, FIG. 5 is an exploded perspective view illustrating main parts of the steering wheel for a vehicle in accordance with the embodiment of the present disclosure, FIG. 6 is a cross-sectional view illustrating that a damper part in accordance with the embodiment of the present disclosure is installed, FIG. 7 is a perspective view illustrating that a first damper housing in accordance with the embodiment of the present disclosure is separated from a second damper housing, and FIG. 8 is a perspective view illustrating that a release prevention protrusion in accordance with the embodiment of the present disclosure is inserted and locked to the second damper housing.

As illustrated in FIGS. 1 to 8, the steering wheel 1 for a vehicle in accordance with the embodiment of the present disclosure includes a damper part 30, a horn bolt part 40, a damper housing 50 and a horn spring 100. The damper part 30 is formed of an elastic material and installed in a connection hole 12 of a horn plate 10. The horn bolt part 40 is fixed to a hub part 24 through the damper part 30, and guides the movement of the horn plate 10. The damper housing 50 is positioned between the damper part 30 and the horn bolt part 40, and moved with the damper part 30. The horn spring 100 supports the damper housing 50 and has elasticity.

As illustrated in FIGS. 1 to 4, a horn operating structure is positioned in the horn plate 10, and moved in a top-to-bottom direction to operate a contact for operating a horn. The horn plate 10 in accordance with the embodiment of the present disclosure is located over the hub part 24 and formed in a plate shape, and has the plurality of connection holes 12 in which the damper parts 30 are installed, respectively. Such a horn plate 10 supports an airbag module, and operates the horn while moved in the top-to-bottom direction by a driver's pressing.

The steering wheel 1 for a vehicle includes a rim 20, a spoke 22 and the hub part 24, and the horn plate 10 is installed over the hub part 24 so as to face the hub part 24. The horn plate 10 is connected to the airbag module, and covered by a separate cover member with the horn plate 10 located over the hub part 24.

The ring-shaped rim 20 is located outside the hub part 24 such that the driver easily holds the rim 20, and the rim 20 and the hub part 24 are connected by the spoke 22.

As illustrated in FIGS. 5 and 6, the damper part 30 is formed of an elastic material and installed in the connection hole 12 of the horn plate 10, and can be modified in various shapes as long as the damper part 30 can reduce vibration.

The damper part 30 in accordance with the embodiment of the present disclosure is formed of an elastic material such as rubber or silicone.

The damper part 30 in accordance with the embodiment of the present disclosure includes an inner member 33, an outer member 34 and a connection member 35. The inner member 33 is installed in a ring shape while abutting on the inside of the damper housing 50. The outer member 34 is located outside the inner member 33, and installed in a shape to cover the horn plate 10. The connection member 35 connects the inner member 33 and the outer member 34.

The inner member 33 is installed in a shape to cover the outside of a first damper housing 60, and extended vertically in a longitudinal direction. The outer member 34 is installed in a ring shape outside the inner member 33, and installed in a shape to cover the horn plate 10 facing the connection hole 12.

The outer member 34 has a cross-section formed in a U-shape, and mounted on the horn plate 10 while covering the top and bottom of the horn plate 10. Therefore, the outer member 34 prevents the damper part 30 from separating from the horn plate 10.

The connection member 35 is formed in a ring shape to connect the outer member 34 and the inner member 33, and has buffer spaces formed at the top and bottom thereof such that the inner member 33 can be moved through the buffer spaces.

The horn bolt part 40 may be modified in various shapes as long as the horn bolt part 40 is fixed to the hub part 24 through the damper part 30 and guides the movement of the horn plate 10. The horn bolt part 40 in accordance with the embodiment of the present disclosure includes a head member 42 located over the horn plate 10, a bolt body 44 extended from the head member 42 through the inside of the damper housing 50, and a fastening body 46 extended from the bolt body 44 and fixed to the hub part 24.

The horn bolt part 40 is formed of steel, and serves as a vertical shaft that guides the horn plate 10 and the damper part 30 to move in the top-to-bottom direction when the horn is operated.

The head member 42 is located over the horn plate 10, and extended in a horizontal direction. Under the head member 42, the first damper housing 60 is positioned.

The bolt body 44 has a pillar shape which is extended downward from the head member 42, and passed through the inside of the damper housing 50. The fastening body 46 is extended from the bolt body 44, and has a screw thread formed on the outside thereof so as to be fixed to the hub part 24.

As illustrated in FIGS. 5 to 8, the damper housing 50 can be modified in various shapes as long as the damper housing 50 is located between the damper part 30 and the horn bolt part 40, and moved with the damper part 30. The damper housing 50 in accordance with the embodiment of the present disclosure is formed of a plastic material, and located over, under and inside the damper part 30 such that the damper part 30 does not directly abut on the horn bolt part 40.

Such a damper housing 50 includes the first damper housing 60 and a second damper housing 70. The first damper housing 60 is extended from the top of the horn plate 10 to the bottom of the damper part 30, and the second damper housing 70 is located under the damper part 30, fastened to the first damper housing 60, and supported by the horn spring 100.

The damper housing 50 is constituted by two parts. The first damper housing 60 protects the top surface of the damper part 30 and the inner surface of the damper part 30, facing the bolt body 44. The second damper housing 70 protects the bottom surface of the damper part 30.

The first damper housing 60 for preventing contact between the damper part 30 and the horn bolt part 40 includes a housing head 62, a first housing body 64, a fixing body 66 and a release prevention protrusion 67. The housing head 62 is located between the damper part 30 and the head member 42, the first housing body 64 is extended from the housing head 62 and located between the damper part 30 and the bolt body 44, the fixing body 66 is extended from the first housing body 64 and has a screw thread formed on the outside thereof such that the second damper housing 70 is fastened to the screw thread, and the release prevention protrusion 67 protrudes from the bottom surface of the fixing body 66 and is inserted and locked into a mounting groove of the second damper housing 70.

The first housing body 64 has a hollow portion in which the bolt body 44 is located. The first housing body 64 is formed in a pipe shape extended in the top-to-bottom direction, and the housing head 62 is connected to the top of the first housing body 64.

The housing head 62 is extended in an upward oblique direction from the top of the first housing body 64, and then extended in a horizontal direction. The housing head 62 has an inclined surface abutting on an inclined surface formed on the bottom of the head member 42 of the horn bolt part 40. The top of the housing head 62 faces the bottom of the head member 42, and the bottom of the housing head 62 faces the top of the damper part 30. Thus, the top of the housing head 62 supports the head member 42, and the bottom of the housing head 62 abuts on the damper part 30.

The first housing body 64 is installed vertically through the center of the inner member 33, and the fixing body 66 is connected to the bottom of the first housing body 64. The fixing body 66 is located under the inner member 33, and the fixing body 66 has a screw thread formed on the outside thereof.

The second damper housing 70 can be modified in various shapes as long as the second damper housing 70 is located under the damper part 30, fastened to the first damper housing 60 and moved with the first damper housing 60, and the bottom thereof is supported by the horn spring 100. The second damper housing 70 prevents the horn spring 100 from being brought into direct contact with the damper part 30. For this operation, the bottom of the second damper housing 70 is supported by the horn spring 100.

The second damper housing 70 in accordance with the embodiment of the present disclosure includes a second housing body 72 and a support member 74. The second housing body 72 is fastened to the outside of the fixing body 66, and the support member 74 is extended outward from the second housing body 72, and supported by the horn spring 100.

The fixing body 66 of the first damper housing 60 and the second housing body 72 of the second damper housing 70 are assembled to each other through a screw coupling method. For this operation, screw threads are formed on the outside of the fixing body 66 and the inside of the second housing body 72.

The release prevention protrusion 67 protrudes downward from the bottom surface of the fixing body 66 facing the second housing body 72, and is inserted and locked to the mounting groove of the second housing body 72. The release prevention protrusion 67 in accordance with the embodiment of the present disclosure has a cross-section formed in a right-angled triangle shape. In the present embodiment, the plurality of release prevention protrusions 67 are installed on the bottom surface in the circumferential direction.

On the bottom surface of the fixing body 66, the inclined surface 68 of the release prevention protrusion 67 is installed in the clockwise or counterclockwise direction, and the second damper housing 70 is locked to a locking bump 69 of the release prevention protrusion 67, which vertically protrudes, and prevents the release of the first damper housing 60. The release prevention protrusion 67 which is a locking structure formed in an inclined surface shape, is formed at an end of the fixing body 66.

The release prevention protrusion 67 in accordance with the embodiment of the present disclosure includes an inclined surface 68 and the locking bump 69. The inclined surface 68 is inclined downward and protrudes from the fixing body 66, and the locking bump 69 has an end formed on one side of the inclined surface 68. In the present embodiment, the plurality of release prevention protrusions 67 are installed in the circumferential direction along the bottom surface of the fixing body 66, and rotated with the bolt body 44 and locked and fixed to the mounting groove.

The structure fixed by the release prevention protrusion 67 will be described again as follows. The second housing body 72 is screwed to the fixing body 66, and the release prevention protrusion 67 is rotated while abutting on a base surface 85 formed inside the second damper housing 70. The base surface 85 of the second damper housing 70 is deformed along the inclined surface 68 of the release prevention protrusion 67, and then the release prevention protrusion 67 is inserted into the mounting groove and constrained from moving.

Although the second damper housing 70 is to be rotated by vibration or the like, the base surface 85 is locked to the locking bump 69 of the release prevention protrusion 67. Thus, the rotation of the second damper housing 70 is constrained to prevent release of the second damper housing 70.

The second damper housing 70 is located under the inner member 33, and the second damper housing 70 is screwed to the outside of the fixing body 66. Since the first and second damper housings 60 and 70 are easily separated and coupled, the maintenance cost can be reduced.

The second housing body 72 is installed in a shape to cover the outside of the fixing body 66, and installed in such a manner that the top thereof abuts on the inner member 33. The outer member 34 and the connection member 35 of the damper part 30 are located on the top of the support member 74 protruding laterally from the second housing body 72, and the bottom of the support member 74 is supported by the horn spring 100.

The horn spring 100 supports the damper housing 50 and has elasticity. When the horn is operated, the damper part 30 and the damper housing 50 including the horn plate 10 are moved downward, and the horn plate 10 from which an outer pressing force has been removed is moved upward by a restoring force of the horn spring 100.

The horn plate 10 moved in the top-to-bottom direction has a first contact 110, and the hub part 24 facing the first contact 110 has a second contact 115. Therefore, since the first contact 110 is brought into contact with the second contact 115 by the movement of the horn plate 10 in the top-to-bottom direction, the horn is operated.

Hereafter, the operation state of the steering wheel 1 for a vehicle in accordance with the embodiment of the present disclosure will be described in detail with reference to the accompanying drawings.

In order to operate the horn by pressing the top of the hub part 24 of the steering wheel 1 for a vehicle, the horn plate 10 is moved downward to bring the first contact 110 into contact with the second contact 115. Then, the horn is operated. The horn spring 100 is compressed by the downward movement of the horn plate 10, and the horn spring 100 is returned to the initial shape as an external force is removed, and moves the horn plate 10 upward.

When the horn plate 10 is moved upward and downward, the damper part 30 and the damper housing 50 are moved upward and downward along the horn bolt part 40 while forming one buffer module.

When the vehicle is driven or stopped, vibration transferred to the hub part 24 is absorbed by the damper part 30, and the parts other than the damper housing 50 do not abut on the damper part 30, which makes it possible to prevent a change in natural frequency of the damper part 30.

Since structures engaged with each other in the rotation direction are not provided between the damper housing 50 and the damper part 30, distortion in the damper part 30 by the rotation operations of neighboring parts can be prevented.

In accordance with the embodiment of the present disclosure, the damper housing 50 is installed between the damper part 30 and the horn bolt part 40, which makes it possible to prevent damage which occurs while the damper part 30 formed of an elastic material abuts on the horn bolt part 40 formed of steel. Since the horn bolt part 40 and the damper part 30 are installed separately from each other, a change in natural frequency of the damper part 30 can be prevented, and the horn can be accurately operated to improve operation reliability. Since the second damper housing 70 is screwed to the first damper housing 60, it is possible to reduce the time and cost required for the coupling and maintenance operation of the parts.

Figure 9:
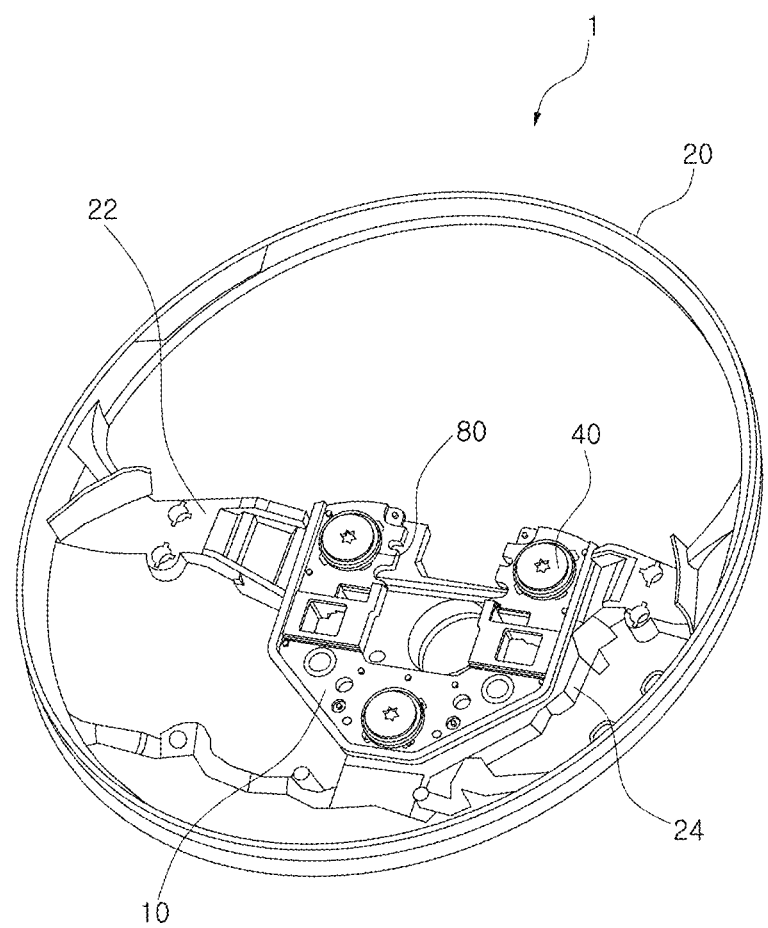
FIG. 9 is a perspective view schematically illustrating a structure of a steering wheel for a vehicle in accordance with another embodiment of the present disclosure.
Figure 10:
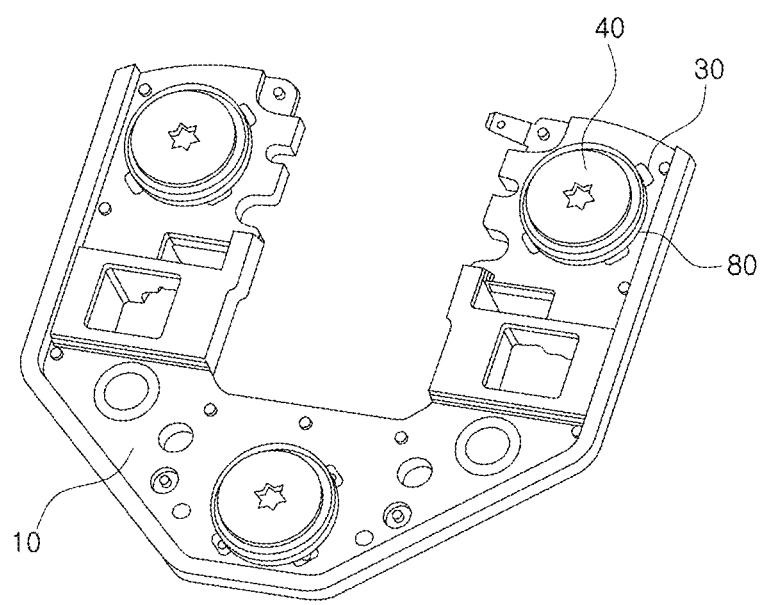
FIG. 10 is a perspective view illustrating that a horn bolt part and a contact plate part are installed on a horn plate in accordance with the embodiment of the present disclosure.
Figure 11:
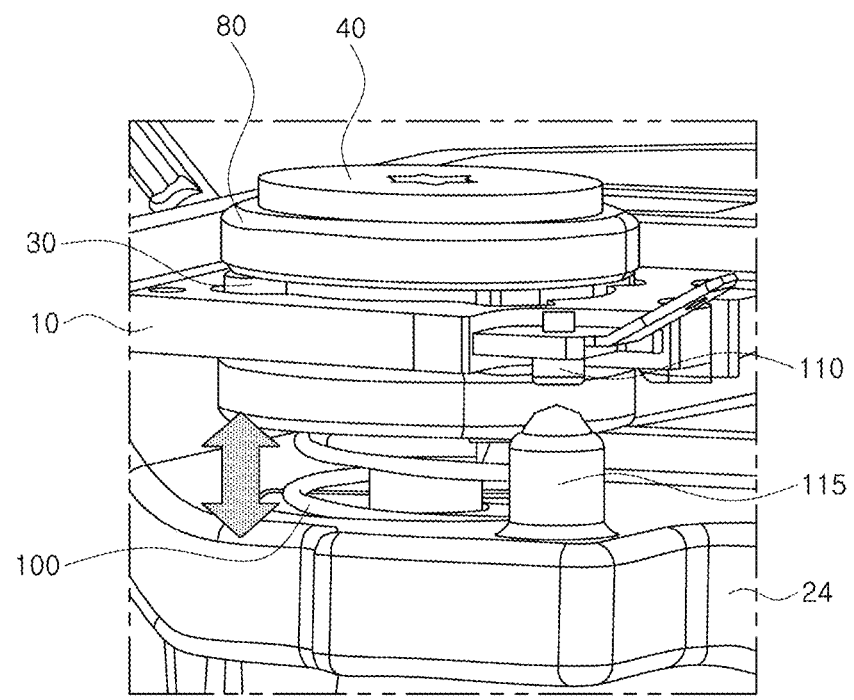
FIG. 11 is a perspective view illustrating a first contact and a second contact in accordance with the embodiment of the present disclosure.
Figure 12:
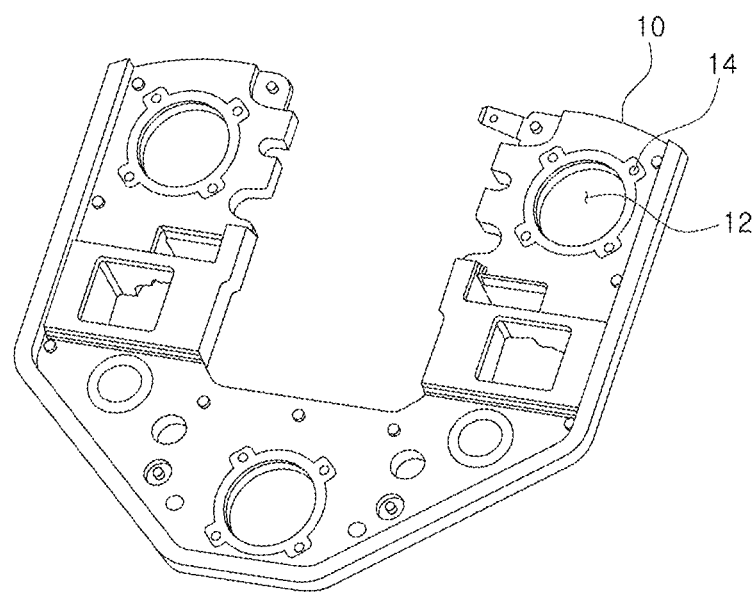
FIG. 12 is a perspective view illustrating the horn plate in accordance with the embodiment of the present disclosure.
Figure 13:
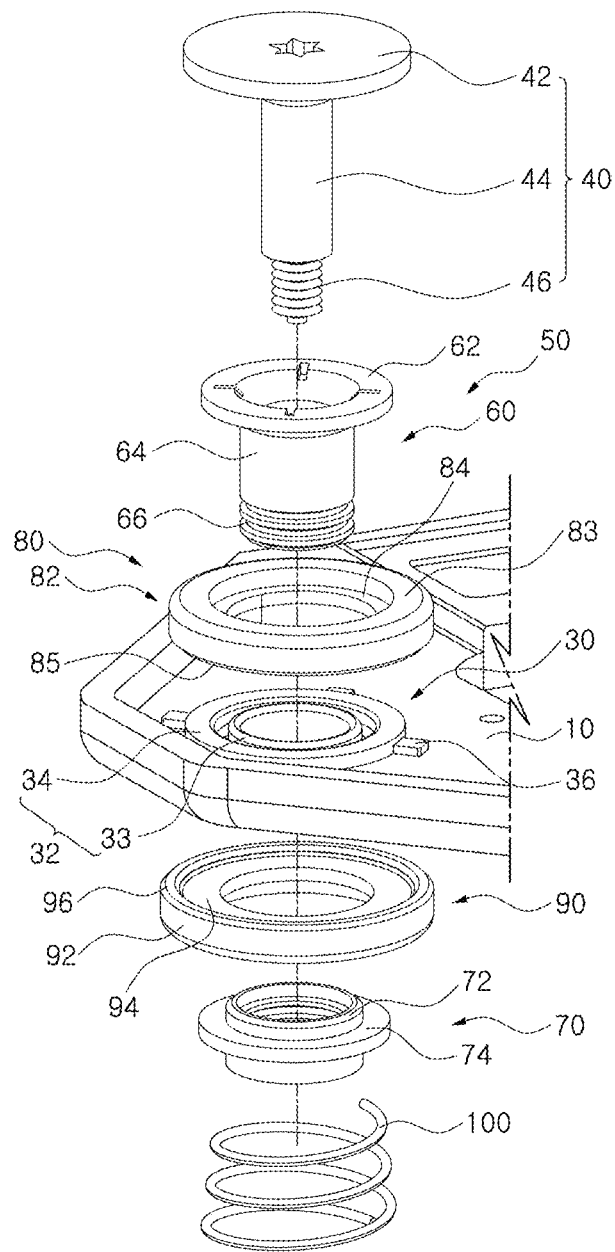
FIG. 13 is an exploded perspective view illustrating main parts of the steering wheel for a vehicle in accordance with the embodiment of the present disclosure.
Figure 14:
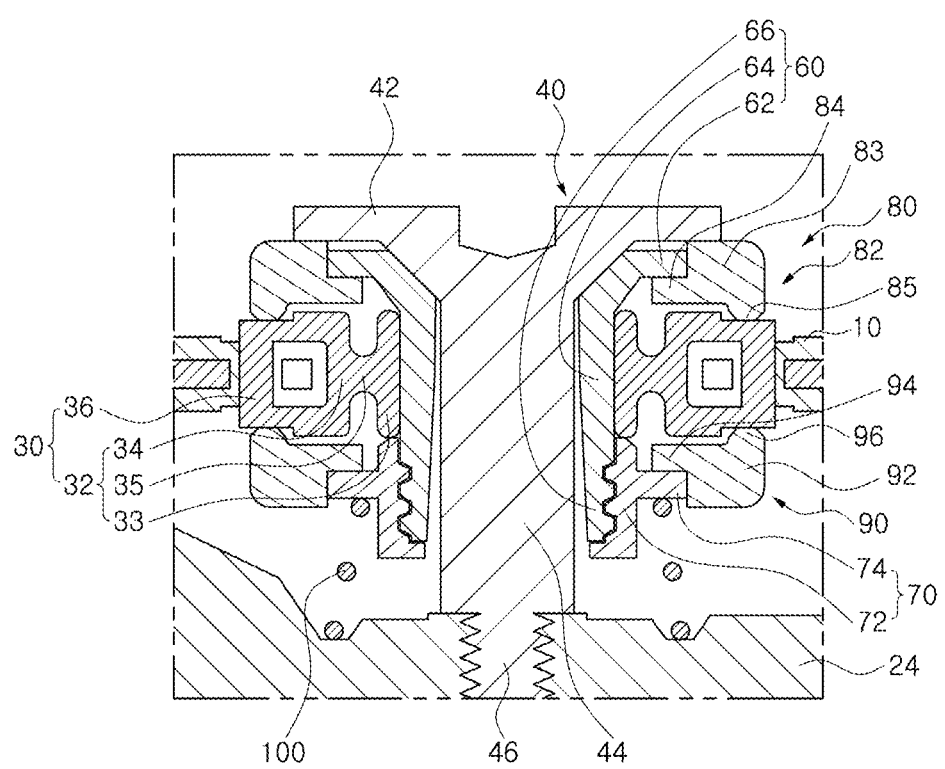
FIG. 14 is a cross-sectional view illustrating that a damper part in accordance with the embodiment of the present disclosure is installed.
Figure 15:
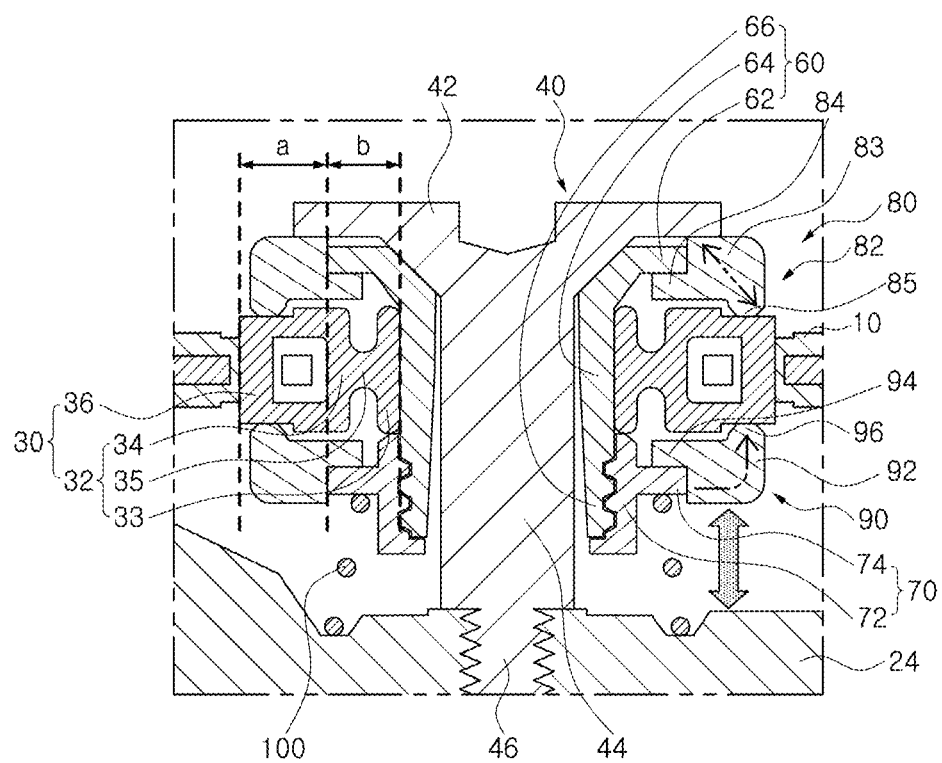
FIG. 15 is a diagram illustrating a main vibration region and a non-main vibration region of the damper part in accordance with the embodiment of the present disclosure.
Figure 16:
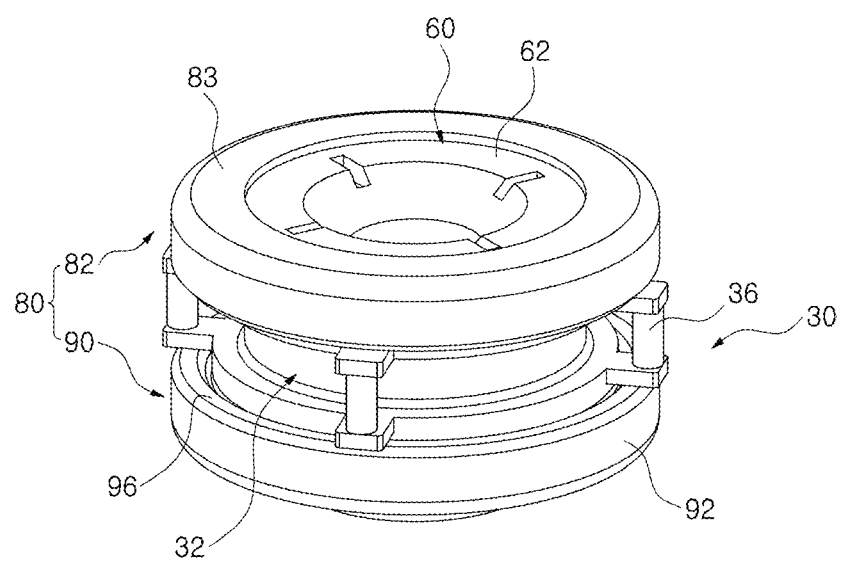
FIG. 16 is a perspective view illustrating the damper part and a contact plate part in accordance with the embodiment of the present disclosure.
Figure 17:
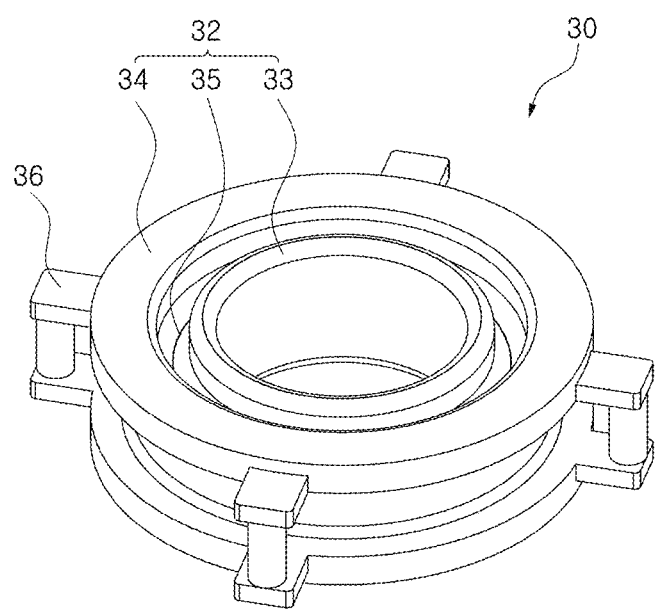
FIG. 17 is a perspective view illustrating the damper part in accordance with the embodiment of the present disclosure.

FIG. 9 is a perspective view schematically illustrating a structure of a steering wheel for a vehicle in accordance with another embodiment of the present disclosure, FIG. 10 is a perspective view illustrating that a horn bolt part and a contact plate part are installed on a horn plate in accordance with the embodiment of the present disclosure, FIG. 11 is a perspective view illustrating a first contact and a second contact in accordance with the embodiment of the present disclosure, FIG. 12 is a perspective view illustrating the horn plate in accordance with the embodiment of the present disclosure, FIG. 13 is an exploded perspective view illustrating main parts of the steering wheel for a vehicle in accordance with the embodiment of the present disclosure, FIG. 14 is a cross-sectional view illustrating that a damper part in accordance with the embodiment of the present disclosure is installed, FIG. 15 is a diagram illustrating a main vibration region and a non-main vibration region of the damper part in accordance with the embodiment of the present disclosure, FIG. 16 is a perspective view illustrating the damper part and a contact plate part in accordance with the embodiment of the present disclosure, and FIG. 17 is a perspective view illustrating the damper part in accordance with the embodiment of the present disclosure.

As illustrated in FIGS. 9 to 17, the steering wheel 1 for a vehicle in accordance with the embodiment of the present disclosure includes a damper part 30, a horn bolt part 40, a damper housing 50 and a contact plate part 80. The damper part 30 is formed of an elastic material and installed in a connection hole 12 of a horn plate 10. The horn bolt part 40 is fixed to a hub part 24 through the damper part 30, and guides the movement of the horn plate 10. The damper housing 50 is located between the damper part 30 and the horn bolt part 40, and moved with the damper part 30. The contact plate part 80 is installed between the damper housing 50 and the damper part 30.

The horn plate 10 has a horn operating structure located thereon, and operates a contact for operating the horn while moved upward and downward along the horn bolt part 40. The horn plate 10 in accordance with the embodiment of the present disclosure is located over the hub part 24 and formed in a plate shape, and has the plurality of connection holes 12 in which the damper parts 30 are installed, respectively. The connection hole 12 has a plurality of fixing holes 14 installed on the circumference thereof, such that fixing protrusions 36 of the damper part 30 are installed in the fixing holes 14.

Such a horn plate 10 supports an airbag module, and operates the horn while moved in the top-to-bottom direction by a driver's pressing.

The steering wheel 1 for a vehicle includes a rim 20, a spoke 22 and the hub part 24, and the horn plate 10 is installed over the hub part 24 so as to face the hub part 24. The horn plate 10 is connected to the airbag module, and covered by a separate cover member with the horn plate 10 located over the hub part 24.

The ring-shaped rim 20 is located outside the hub part 24 such that the driver easily holds the rim 20, and the rim 20 and the hub part 24 are connected by the spoke 22.

The damper part 30 is formed of an elastic material and installed in the connection hole 12 of the horn plate 10, and can be modified in various shapes as long as the damper part 30 can reduce vibration. The damper part 30 in accordance with the embodiment of the present disclosure is formed of an elastic material such as rubber or silicone.

The damper part 30 in accordance with the embodiment of the present disclosure includes a damper body 32 and the fixing protrusion 36. The damper body 32 is installed in such a shape that the inside thereof abuts on the damper housing 50 and the outside thereof covers the horn plate 10, and the fixing protrusion 36 is extended from the damper body 32, and inserted and locked into the fixing hole 14 of the horn plate 10, such that first and second contact plate parts 82 and 90 abut on the outside of the fixing protrusion 36.

The damper body 32 in accordance with the embodiment of the present disclosure includes an inner member 33, an outer member 34 and a connection member 35. The inner member 33 is installed in a ring shape while abutting on the inside of the damper housing 50, the outer member 34 is located outside the inner member 33, and installed in a shape to cover the horn plate 10, and the connection member 35 connects the inner member 33 and the outer member 34.

The inner member 33 is installed in a shape to cover the outside of a first damper housing 60, and extended vertically in a longitudinal direction. The outer member 34 is installed in a ring shape outside the inner member 33, and installed in a shape to cover the horn plate 10 facing the connection hole 12.

The outer member 34 has a cross-section formed in a U-shape, and mounted on the horn plate 10 while covering the top and bottom of the horn plate 10. Therefore, the outer member 34 prevents the damper part 30 from separating from the horn plate 10.

The connection member 35 is formed in a ring shape to connect the outer member 34 and the inner member 33, and has buffer spaces formed at the top and bottom thereof such that the inner member 33 can be moved through the buffer spaces.

The fixing protrusion 36 can be modified in various shape as long as the fixing protrusion 36 is extended from the outer member 34 and inserted and locked to the fixing hole 14 of the horn plate 10. The fixing protrusion 36 in accordance with the embodiment of the present disclosure protrudes from the outer member 34 to the outside, and is fixed to the fixing hole 14 formed in the horn plate 10.

The damper part 30 including the fixing protrusions 36 may be fixed to the horn plate 10 through injection molding, or manufactured as a separate member from the horn plate 10 and then coupled to the horn plate 10.

Since the fixing protrusion 36 is fixed to the fixing hole 14 formed in the outside of the connection hole 12, the fixing protrusion 36 becomes a non-main vibration region (a) where less vibration is generated than the inner member 33. The inner member 33 becomes a main vibration region (b) where more vibration is generated than the fixing protrusion 36.

The fixing protrusions 36 in accordance with the embodiment of the present disclosure are formed in a rectangular shape, and installed at preset intervals along the outer circumference of the outer member 34.

The horn bolt part 40 can be modified in various shapes as long as the horn bolt part 40 is fixed to the hub part 24 through the damper part 30, and the horn bolt part 40 guides the movement of the horn plate 10. The horn bolt part 40 in accordance with the embodiment of the present disclosure includes a head member 42 located over the horn plate 10, a bolt body 44 extended from the head member 42 and passed through the inside of the damper housing 50, and a fastening body 46 extended from the bolt body 44 and fixed to the hub part 24.

The horn bolt part 40 is formed of steel, and serves as a vertical shaft that guides the horn plate 10 and the damper part 30 to move in the top-to-bottom direction when the horn is operated.

The head member 42 is located over the horn plate 10, and extended in a horizontal direction. A first body 83 of the first contact plate part 82 is located under the head member 42. Since the section in which the head member 42 and the first contact plate part 82 abut on each other is the non-main vibration region (a), less vibration is generated than the main vibration region (b).

The bolt body 44 has a pillar shape which is extended downward from the head member 42, and passed through the inside of the damper housing 50. The fastening body 46 is extended from the bolt body 44, and has a screw thread formed on the outside thereof so as to be fixed to the hub part 24.

The damper housing 50 can be modified in various shapes as long as the damper housing 50 is positioned between the damper part 30 and the horn bolt part 40, and moved with the damper part 30. The damper housing 50 in accordance with the embodiment of the present disclosure is formed of a plastic material, and located over, under and inside the damper part 30 such that the damper part 30 does not directly abut on the horn bolt part 40.

Such a damper housing 50 includes the first damper housing 60 and a second damper housing 70. The first damper housing 60 is extended from the top of the horn plate 10 to the bottom of the damper part 30, and the second damper housing 70 is located under the damper part 30, fastened to the first damper housing 60, and supported by the horn spring 100.

The first damper housing 60 can be modified in various shapes as long as the first damper housing 60 is extended from the top of the first contact plate part 82 to the bottom of the damper part 30. The first damper housing 60 in accordance with the embodiment of the present disclosure includes a housing head 62, a first housing body 64 and a fixing body 66. The housing head 62 is located over the damper part 30, and has a larger outer diameter than the inner diameter of the damper part 30. The first housing body 64 is extended from the housing head 62 and positioned between the damper part 30 and the horn bolt part 40. The fixing body 66 is extended from the first housing body 64, and has a screw thread formed on the outside thereof such that the second damper housing 70 is fastened to the screw thread.

The first housing body 64 has a hollow portion in which the bolt body 44 is located. The first housing body 64 is formed in a pipe shape extended in the top-to-bottom direction, and the housing head 62 is connected to the top of the first housing body 64.

The housing head 62 is extended in an upward oblique direction from the top of the first housing body 64, and then extended in a horizontal direction. The housing head 62 has an inclined surface abutting on an inclined surface formed on the bottom of the head member 42 of the horn bolt part 40. The top of the housing head 62 does not abut on the bottom of the head member 42, and only the first contact plate part 82 abuts on the bottom of the head member 42.

The first housing body 64 is installed vertically through the inside of the inner member 33, and the fixing body 66 is connected to the bottom of the first housing body 64. The fixing body 66 is located at the bottom of the inner member 33, and the fixing body 66 has a screw thread formed on the outside thereof.

The second damper housing 70 can be modified in various shapes as long as the second damper housing 70 is located under the second contact plate part 90, and fastened to the first damper housing 60 and the bottom thereof is supported by the horn spring 100. The second damper housing 70 in accordance with the embodiment of the present disclosure includes a second housing body 72 and a support member 74. The second housing body 72 is fastened to the outside of the fixing body 66, and the support member 74 is extended outward from the second housing body 72, and supported by the horn spring 100.

The second damper housing 70 is located under the inner member 33, and screwed to the outside of the fixing body 66. Since the first and second damper housings 60 and 70 are easily separated and coupled, the maintenance cost can be reduced.

The second housing body 72 is installed in a shape to cover the outside of the fixing body 66, and installed in such a manner that the top thereof abuts on the inner member 33. The second contact plate part 90 is positioned on the top of the support member 74 protruding laterally from the second housing body 72, and the bottom of the support member 74 is supported by the horn spring 100.

The contact plate part 80 is installed between the damper housing 50 and the damper part 30, and abuts on the top and bottom of the damper part 30. The contact plate part 80 in accordance with the embodiment of the present disclosure includes the first contact plate part 82 and the second contact plate part 90.

The first contact plate part 82 is installed to abut on the top surface of the fixing protrusion 36 installed in the non-main vibration region (a) in the damper part 30, and the top of the first contact plate part 82 abuts on the head member 42 of the horn bolt part 40.

Therefore, the first contact plate part 82 may manage the distance between the head member 42 and the fixing protrusion 36. When the distance between the head member 42 and the fixing protrusion 36 is increased, the size of the first contact plate part 82 is increased to adjust the distance between the head member 42 and the fixing protrusion 36.

The second contact plate part 90 is installed to abut on the bottom surface of the fixing protrusion 36 installed in the non-main vibration region (a) in the damper part 30, and the body of the second contact plate part 90 is locked and supported by the second damper housing 70. Therefore, since the second contact plate part 90 abuts on the second damper housing 70 supported by the horn spring 100, horn tension caused by the horn spring 100 may be transferred to the damper part 30.

Since the contact plate part 80 is installed, the damper body 32 abuts on only the first damper housing 60 and does not abut on the other parts in the main vibration region (b) where the damper body 32 of the damper part 30 is located, which makes it possible to improve the durability of the damper part 30, and to prevent a change in natural frequency of the damper part 30.

The first damper housing 60 and the second damper housing 70 are fixed with the inner member 33 of the damper part 30 interposed therebetween, the first contact plate part 82 is installed between the damper part 30 and the first damper housing 60, and the second contact plate part 90 is installed between the damper part 30 and the second damper housing 70 so as to form one buffer module.

The contact plate part 80 is coupled to the damper housing 50 in the top-to-bottom direction, but not engaged with the damper housing 50 in the rotation direction. Since the contact plate part 80 is not engaged with the damper housing 50 in the rotation direction, the contact plate part 80 is not rotated even though the damper housing 50 is rotated. Therefore, it is possible to prevent the contact surface of the damper part 30, on which the contact plate part 80 abuts, in a shear direction from being distorted in the rotation direction of the damper housing 50.

That is, since structures engaged with each other in the rotation direction are not provided between the damper housing 50 and the contact plate part 80, rotation doe not occur on the top and bottom shear surfaces of the damper part 30, even though the damper housing 50 is rotated by assembling and vibration.

Since the first contact plate part 82 is installed higher than the first damper housing 60, the first contact plate part 82 is brought into direct contact with the head member 42 of the horn bolt part 40. Therefore, when the horn plate 10 is moved upward and downward to operate the horn, it is possible to prevent operating noise generated by the interference between the first damper housing 60 and the first contact plate part 82.

The first contact plate part 82 includes a first body 83, a first inner protrusion 84 and a first contact protrusion 85. The first body 83 is installed between the top of the damper part 30 and the first damper housing 60, and supports the head member 42 of the horn bolt part 40. The first inner protrusion 84 protrudes laterally from the first body 83, and supports the first damper housing 60. The first contact protrusion 85 is extended downward from the first body 83 and abuts on the damper part 30.

The first body 83 is installed in a ring shape to cover the outside of the housing head 62, and the top of the first body 83 supports the bottom of the head member 42 of the horn bolt part 40. The first inner protrusion 84 protruding to the inside of the first body 83 supports the bottom of the housing head 62. When the first body 83 abuts on the bottom of the head member 42, the housing head 62 is separated from the head member 42.

The first contact protrusion 85 protruding from the bottom of the first body 83 is installed to abut on the top of the fixing protrusion 36 of the damper part 30.

The second contact plate part 90 can be modified in various shapes as long as the second contact plate part 90 is installed between the bottom of the damper part 30 and the second damper housing 70, and transfers the spring force of the horn spring 100 to the damper part 30. The second contact plate part 90 in accordance with the embodiment of the present disclosure includes a second body 92, a second inner protrusion 94 and a second contact protrusion 96. The second body 92 is positioned under the damper part 30. The second inner protrusion 94 protrudes laterally from the second body 92, and is supported by the horn spring 100. The second contact protrusion 96 is extended upward from the second body 92 and abuts on the damper part 30.

The second body 92 is installed in a ring shape to cover the second damper housing 70, and the bottom of the second inner protrusion 94 protruding to the inside of the second body 92 is supported by the support member 74 of the second damper housing 70. The second contact protrusion 96 protruding upward from the second body 92 is installed to abut on the bottom of the fixing protrusion 36.

The horn spring 100 is installed on the top of the hub part 24 while supporting the second damper housing 70. When the horn is operated, the damper part 30 including the horn plate 10 is moved downward, and the horn plate 10 from which an outer pressing force has been removed is moved upward by a restoring force of the horn spring 100.

The horn plate 10 moved in the top-to-bottom direction has a first contact 110, and the hub part 24 facing the first contact 110 has a second contact 115. Therefore, since the first contact 110 is brought into contact with the second contact 115 by the movement of the horn plate 10 in the top-to-bottom direction, the horn is operated.

In the damper structure of the steering wheel 1 for a vehicle, the non-main vibration region (a) includes the fixing protrusion 36, the first body 83 located over the fixing protrusion 36, and the second body 92 located under the fixing protrusion 36.

In the damper structure of the steering wheel 1 for a vehicle, the main vibration region (b) includes the damper body 32 and the second damper housing 70. Since less vibration is applied to the non-main vibration region (a) than the main vibration region (b), the non-main vibration region (a) is vibrated less than the main vibration region (b).

Hereafter, the operation state of the steering wheel 1 for a vehicle in accordance with the embodiment of the present disclosure will be described in detail with reference to the accompanying drawings.

In order to operate the horn by pressing the top of the hub part 24 of the steering wheel 1 for a vehicle, the horn plate 10 is moved downward to bring the first contact 110 into contact with the second contact 115. Then, the horn is operated. The horn spring 100 is compressed by the downward movement of the horn plate 10, and the horn spring 100 is returned to the initial shape and moves the horn plate 10 upward, as an external force is removed.

When the horn plate 10 is moved upward and downward, the damper part 30, the damper housing 50 and the contact plate part 80 are moved upward and downward along the horn bolt part 40 while forming one buffer module.

When the vehicle is driven or stopped, vibration transferred to the hub part 24 is absorbed by the damper body 32, and the parts other than the damper housing 50 are not brought into contact with the damper body 32, thereby preventing a change in natural frequency of the damper part 30.

Vibration transferred to the hub part 24 is transferred from the horn bolt part 40 to the damper housing 50, and transferred to the fixing protrusion 36 through the contact plate part 80 abutting on the damper housing 50, such that the damper part 30 and the contact plate part 80 are brought into contact with each other in the non-main vibration region (a). Therefore, since the natural frequency of the damper part 30 can be maintained in comparison to the buffer structure in which the contact plate part 80 is brought into contact with the damper body 32, the operation reliability is improved.

Since structures engaged with each other in the rotation direction are not provided between the damper housing 50 and the contact plate part 80, it is possible to prevent distortion in the damper part 30 by the rotation operations of neighboring parts.

In accordance with the embodiment of the present disclosure, the damper housing 50 is installed between the damper part 30 and the horn bolt part 40, which makes it possible to prevent damage which occurs while the damper part 30 formed of an elastic material abuts on the horn bolt part 40 formed of steel. The damper part 30 is not brought in contact with the contact plate part 80 in the main vibration region (b) of the damper part 30, but brought in contact with the contact plate part 80 only in the non-main vibration region (a) thereof. Therefore, it is possible to prevent a change in natural frequency of the damper part 30. Furthermore, since the rotation of the damper housing 50 is not transferred to the contact plate part 80, distortion in the damper part 30 may be prevented to improve the durability of the damper part 30. Furthermore, since the contact plate part 80 abuts on the head member 42 of the horn bolt part 40 before the damper housing 50, noise can be reduced.

Figure 18:
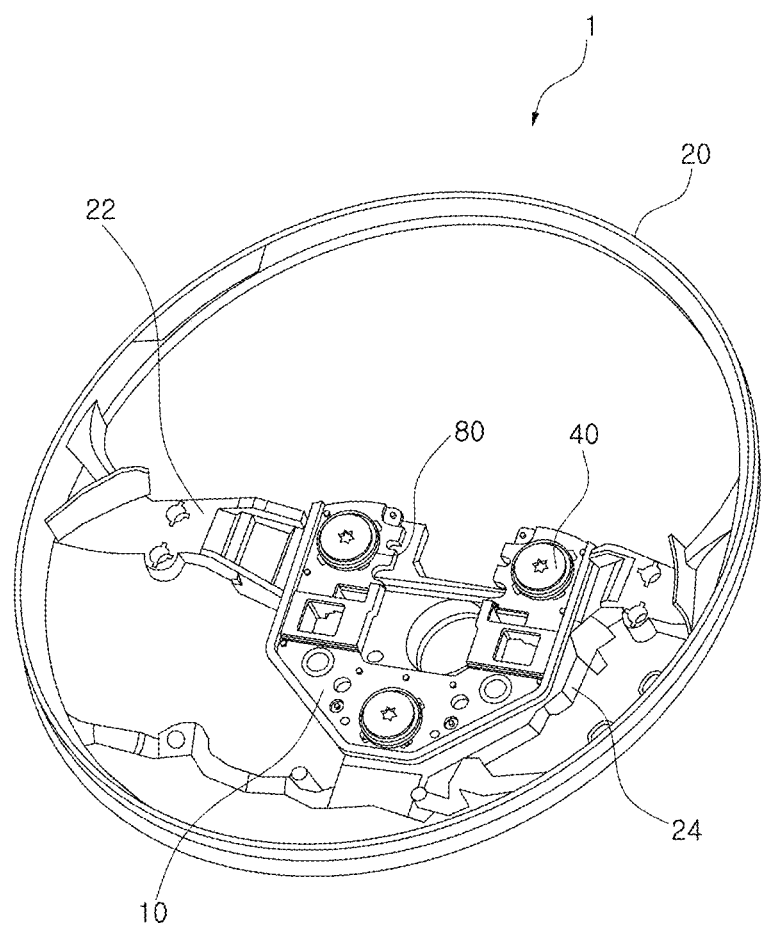
FIG. 18 is a perspective view schematically illustrating a structure of a steering wheel for a vehicle in accordance with still another embodiment of the present disclosure.
Figure 19:
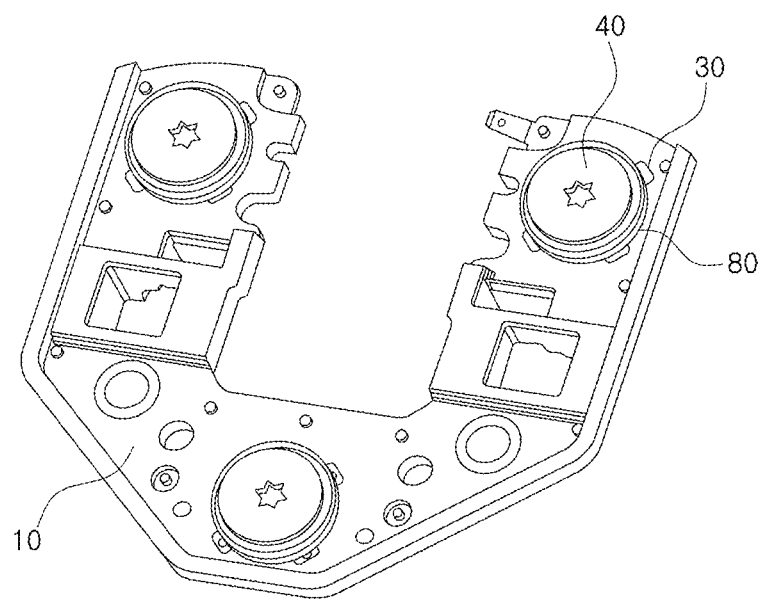
FIG. 19 is a perspective view illustrating that a horn bolt part and a contact plate part are installed on a horn plate in accordance with the embodiment of the present disclosure.
Figure 20:
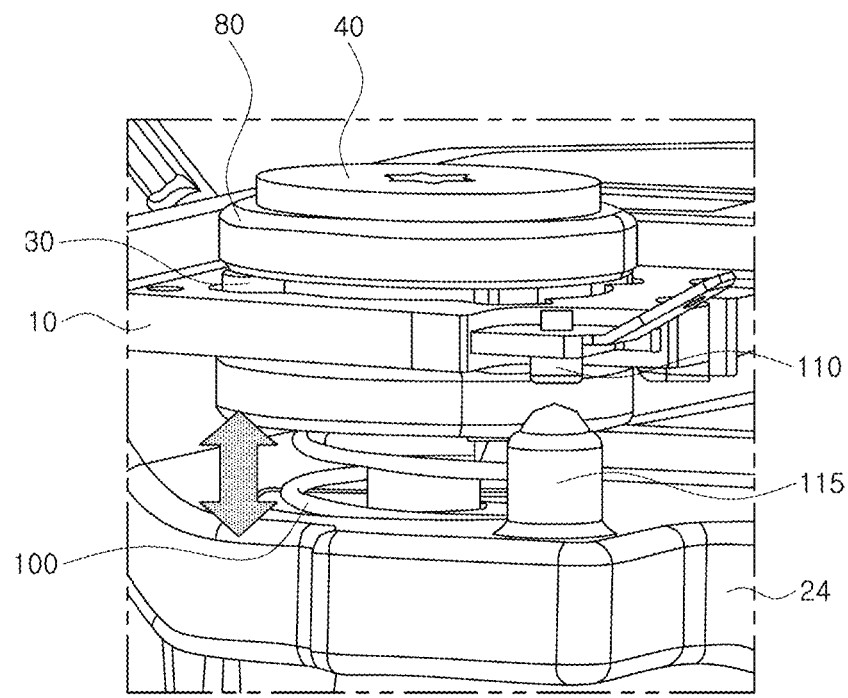
FIG. 20 is a perspective view illustrating a first contact and a second contact in accordance with the embodiment of the present disclosure.
Figure 21:
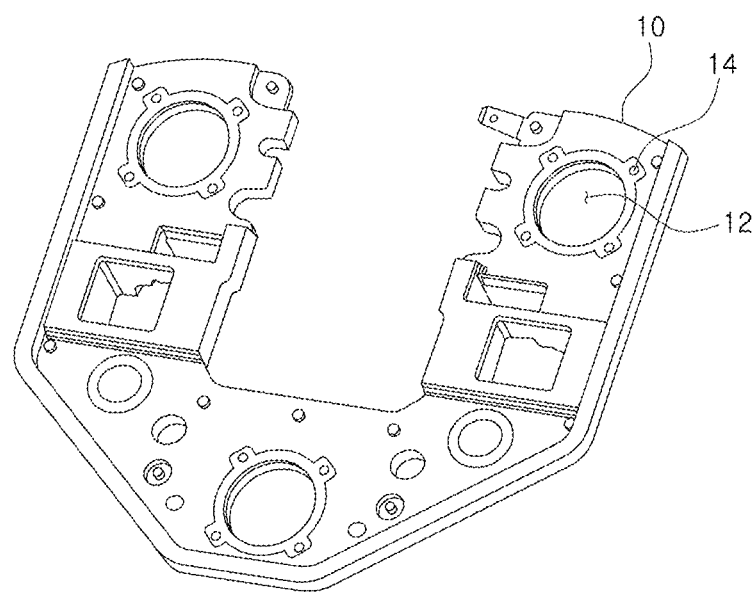
FIG. 21 is a perspective view illustrating the horn plate in accordance with the embodiment of the present disclosure.
Figure 22:
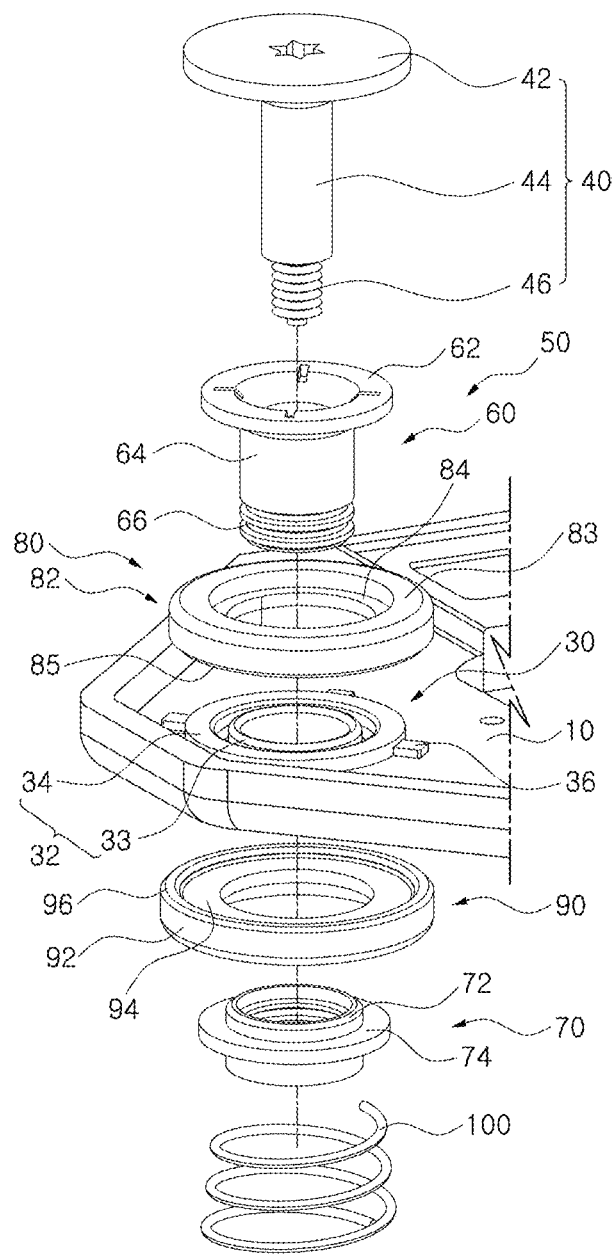
FIG. 22 is an exploded perspective view illustrating main parts of the steering wheel for a vehicle in accordance with the embodiment of the present disclosure.
Figure 23:
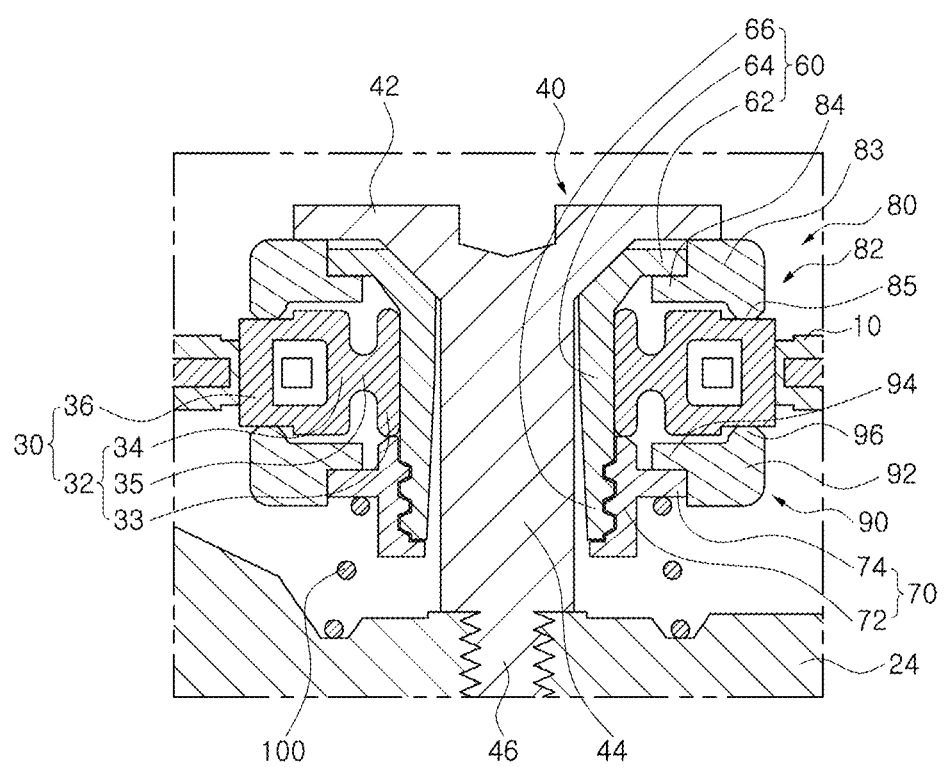
FIG. 23 is a cross-sectional view illustrating that a damper part in accordance with the embodiment of the present disclosure is installed.
Figure 24:
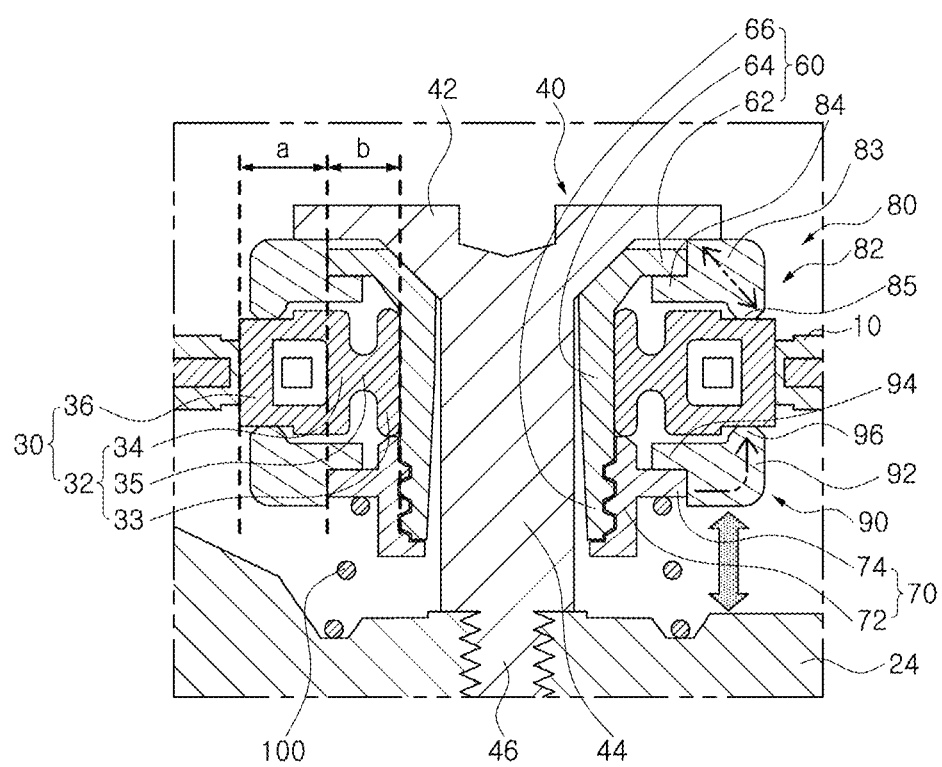
FIG. 24 is a diagram illustrating a main vibration region and a non-main vibration region of the damper part in accordance with the embodiment of the present disclosure.
Figure 25:
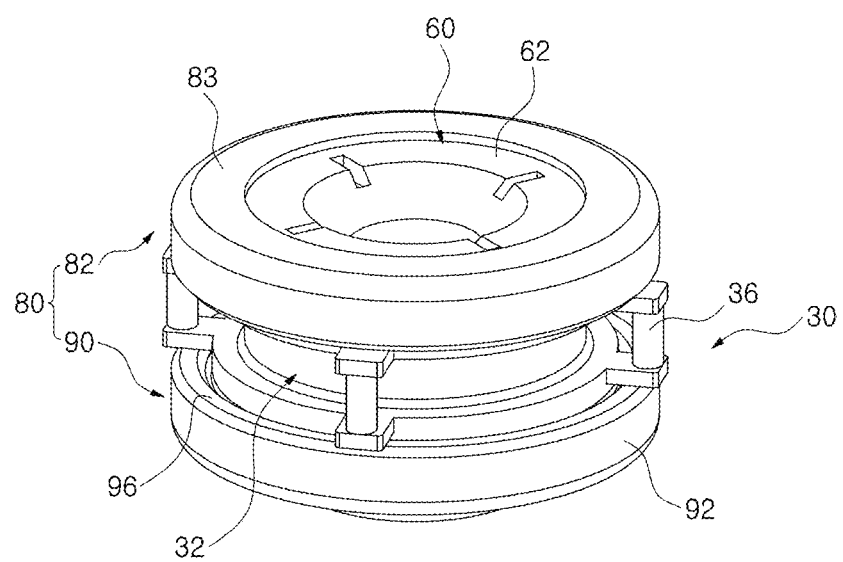
FIG. 25 is a perspective view illustrating the damper part and a contact plate part in accordance with the embodiment of the present disclosure.
Figure 26:
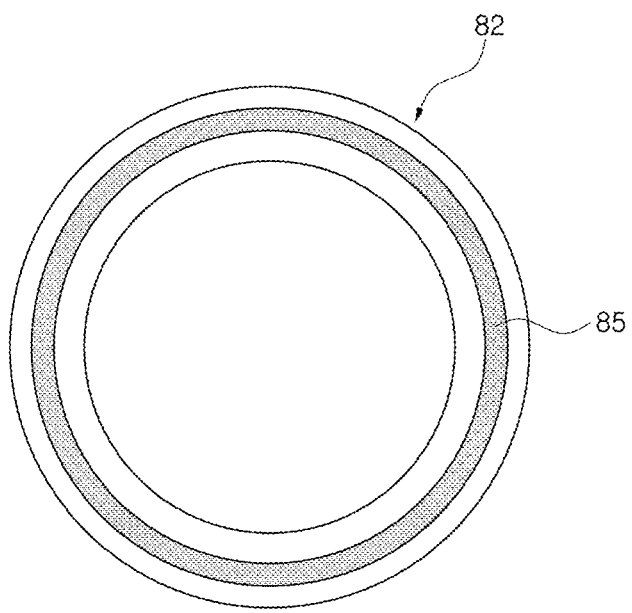
FIGS. 26 to 28 are bottom views illustrating a first contact plate part and a first contact protrusion in accordance with the embodiment of the present disclosure.
Figure 27:
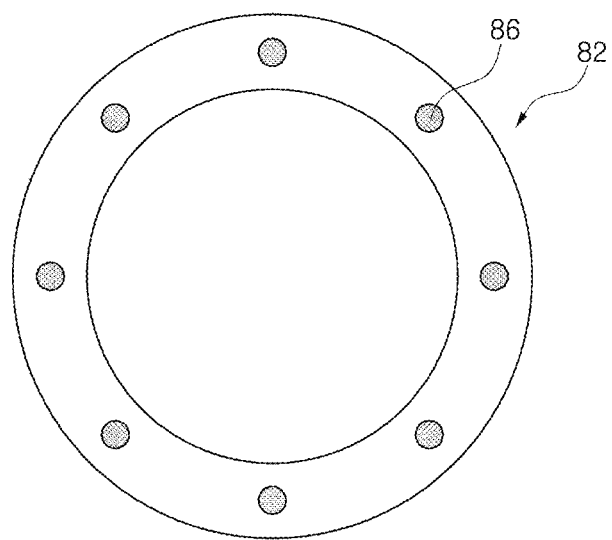
Figure 28:
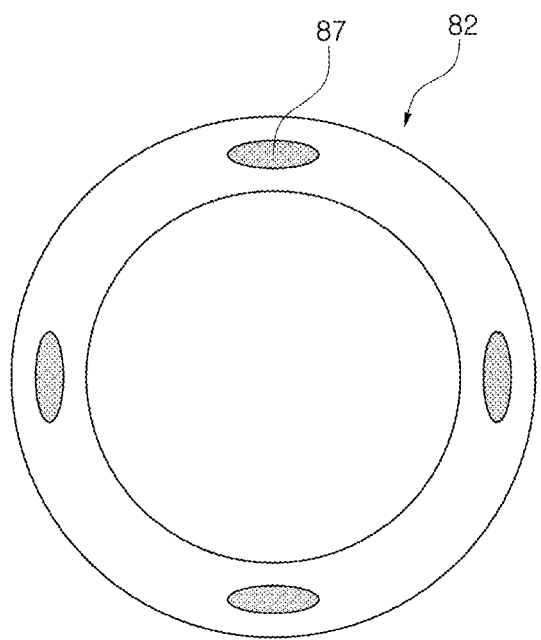
Figure 29:
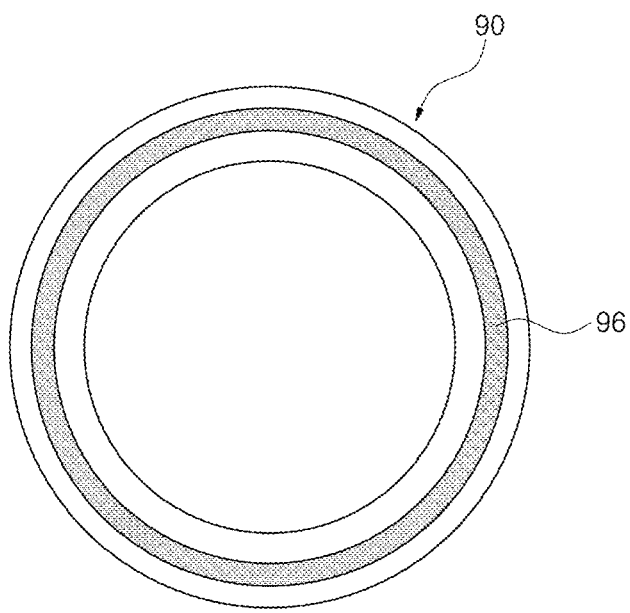
FIGS. 29 to 31 are plan views illustrating a second contact plate part and a second contact protrusion in accordance with the embodiment of the present disclosure.
Figure 30:
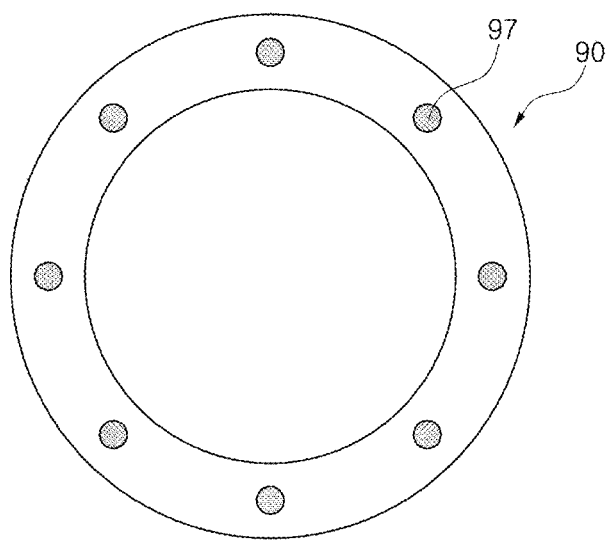
Figure 31:
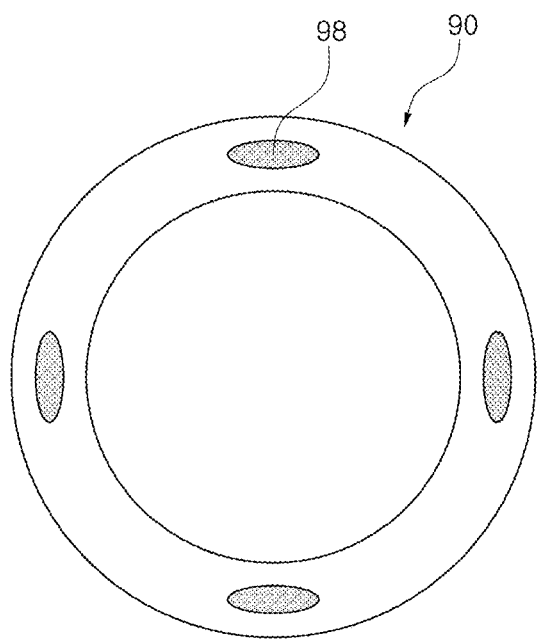
Figure 32:
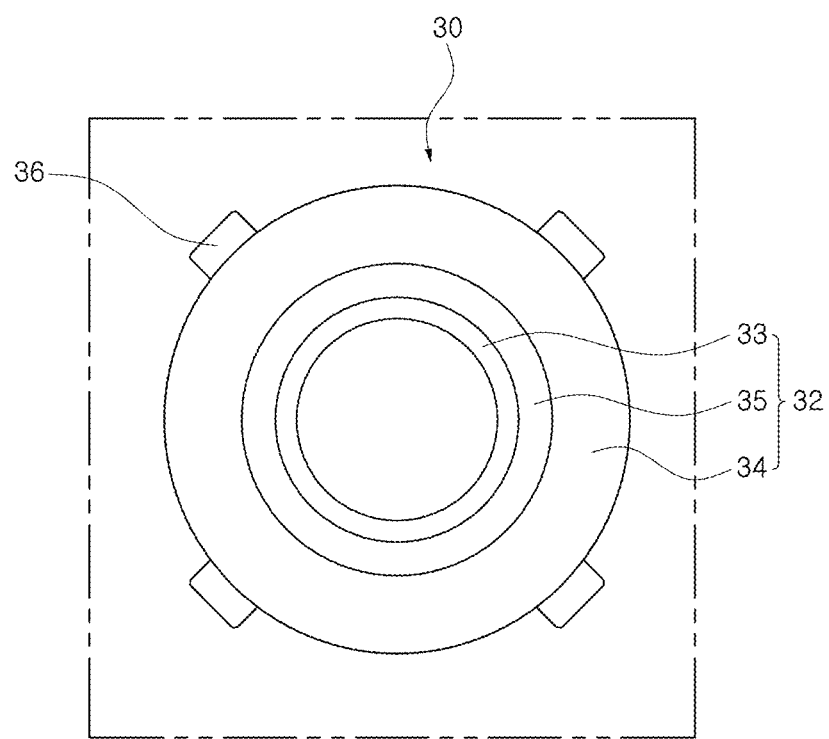
FIG. 32 is a plan view illustrating the damper part in accordance with the embodiment of the present disclosure.

FIG. 18 is a perspective view schematically illustrating a structure of a steering wheel for a vehicle in accordance with still another embodiment of the present disclosure, FIG. 19 is a perspective view illustrating that a horn bolt part and a contact plate part are installed on a horn plate in accordance with the embodiment of the present disclosure, FIG. 20 is a perspective view illustrating a first contact and a second contact in accordance with the embodiment of the present disclosure, FIG. 21 is a perspective view illustrating the horn plate in accordance with the embodiment of the present disclosure, FIG. 22 is an exploded perspective view illustrating main parts of the steering wheel for a vehicle in accordance with the embodiment of the present disclosure, FIG. 23 is a cross-sectional view illustrating that a damper part in accordance with the embodiment of the present disclosure is installed, FIG. 24 is a diagram illustrating a main vibration region and a non-main vibration region of the damper part in accordance with the embodiment of the present disclosure, FIG. 25 is a perspective view illustrating the damper part and a contact plate part in accordance with the embodiment of the present disclosure, FIGS. 26 to 28 are bottom views illustrating a first contact plate part and a first contact protrusion in accordance with the embodiment of the present disclosure, FIGS. 29 to 31 are plan views illustrating a second contact plate part and a second contact protrusion in accordance with the embodiment of the present disclosure, and FIG. 32 is a plan view illustrating the damper part in accordance with the embodiment of the present disclosure.

As illustrated in FIGS. 18 to 26, the steering wheel 1 for a vehicle in accordance with the present disclosure includes a damper part 30, a horn bolt part 40, a damper housing 50 and a contact plate part 80. The damper part 30 is formed of an elastic material and installed in a connection hole 12 of a horn plate 10. The horn bolt part 40 is fixed to a hub part 24 through the damper part 30, and guides the movement of the horn plate 10. The damper housing 50 is positioned between the damper part 30 and the horn bolt part 40, and moved with the damper part 30. The contact plate part 80 is installed between the damper housing 50 and the damper part 30.

The horn plate 10 has a horn operating structure located therein, and operates a contact for operating the horn while moved upward and downward along the horn bolt part 40. The horn plate 10 in accordance with the embodiment of the present disclosure is located over the hub part 24 and formed in a plate shape, and has the plurality of connection holes 12 in which the damper parts 30 are installed, respectively. The connection hole 12 has a plurality of fixing holes 14 installed on the circumference thereof, such that fixing protrusions 36 of the damper part 30 are installed in the fixing holes 14.

Such a horn plate 10 supports an airbag module, and operates the horn while moved in the top-to-bottom direction by a driver's pressing.

The steering wheel 1 for a vehicle includes a rim 20, a spoke 22 and the hub part 24, and the horn plate 10 is installed over the hub part 24 so as to face the hub part 24. The horn plate 10 is connected to the airbag module, and covered by a separate cover member with the horn plate 10 located over the hub part 24.

The ring-shaped rim 20 is located outside the hub part 24 such that the driver easily holds the rim 20, and the rim 20 and the hub part 24 are connected by the spoke 22.

The damper part 30 is formed of an elastic material and installed in the connection hole 12 of the horn plate 10, and can be modified in various shapes as long as the damper part 30 can reduce vibration. The damper part 30 in accordance with the embodiment of the present disclosure is formed of an elastic material such as rubber or silicone.

The damper part 30 in accordance with the embodiment of the present disclosure includes a damper body 32 and the fixing protrusion 36. The damper body 32 is installed in such a shape that the inside thereof abuts on the damper housing 50 and the outside thereof covers the horn plate 10, and the fixing protrusion 36 is extended from the damper body 32, and inserted and locked into the fixing hole 14 of the horn plate 10, such that first and second contact plate parts 82 and 90 abut on the outside of the fixing protrusion 36.

The damper body 32 in accordance with the embodiment of the present disclosure includes an inner member 33, an outer member 34 and a connection member 35. The inner member 33 is installed in a ring shape while abutting on the inside of the damper housing 50. The outer member 34 is located outside the inner member 33, and installed in a shape to cover the horn plate 10. The connection member 35 connects the inner member 33 and the outer member 34.

The inner member 33 is installed in a shape to cover the outside of a first damper housing 60, and extended vertically in a longitudinal direction. The outer member 34 is installed in a ring shape outside the inner member 33, and installed in a shape to cover the horn plate 10 facing the connection hole 12.

The outer member 34 has a cross-section formed in a U-shape, and mounted on the horn plate 10 while covering the top and bottom of the horn plate 10. Therefore, the outer member 34 prevents the damper part 30 from separating from the horn plate 10.

The connection member 35 is formed in a ring shape to connect the outer member 34 and the inner member 33, and has buffer spaces formed at the top and bottom thereof such that the inner member 33 can be moved through the buffer spaces.

The fixing protrusion 36 can be modified in various shape as long as the fixing protrusion 36 is extended from the outer member 34 and inserted and locked to the fixing hole 14 of the horn plate 10. The fixing protrusion 36 in accordance with the embodiment of the present disclosure protrudes outward from the outer member 34, and is fixed to the fixing hole 14 formed in the horn plate 10.

The damper part 30 including the fixing protrusions 36 may be fixed to the horn plate 10 through insert injection molding, or manufactured as a separate member from the horn plate 10 and then coupled to the horn plate 10.

Since the fixing protrusion 36 is fixed to the fixing hole 14 formed in the outside of the connection hole 12, the fixing protrusion 36 becomes a non-main vibration region (a) where less vibration is generated than the inner member 33. The inner member 33 becomes a main vibration region (b) where more vibration is generated than the fixing protrusion 36.

The fixing protrusions 36 in accordance with the embodiment of the present disclosure are formed in a rectangular shape, and installed at preset intervals along the outer circumference of the outer member.

The horn bolt part 40 is fixed to the hub part 24 through the damper part 30, and can be deformed in various shapes as long as the horn bolt part 40 guides the movement of the horn plate 10. The horn bolt part 40 in accordance with the embodiment of the present disclosure includes a head member 42 located over the horn plate 10, a bolt body 44 extended from the head member 42 through the inside of the damper housing 50, and a fastening body 46 extended from the bolt body 44 and fixed to the hub part 24.

The horn bolt part 40 is formed of steel, and serves as a vertical shaft that guides the horn plate 10 and the damper part 30 to move in the top-to-bottom direction when the horn is operated.

The head member 42 is located over the horn plate 10, and extended in a horizontal direction. A first body 83 of the first contact plate part 82 is located under the head member 42. Since the section in which the head member 42 and the first contact plate part 82 abut on each other is the non-main vibration region (a), less vibration is generated than the main vibration region (b).

The bolt body 44 has a pillar shape which is extended downward from the head member 42, and passed through the inside of the damper housing 50. The fastening body 46 is extended from the bolt body 44, and has a screw thread formed on the outside thereof so as to be fixed to the hub part 24.

The damper housing 50 can be modified in various shapes as long as the damper housing 50 is located between the damper part 30 and the horn bolt part 40, and moved with the damper part 30. The damper housing 50 in accordance with the embodiment of the present disclosure is formed of a plastic material, and located over, under and inside the damper part 30 such that the damper part 30 does not directly abut on the horn bolt part 40.

Such a damper housing 50 includes the first damper housing 60 and a second damper housing 70. The first damper housing 60 is extended from the top of the horn plate 10 to the bottom of the damper part 30, and the second damper housing 70 is located under the damper part 30, fastened to the first damper housing 60, and supported by the horn spring 100.

The first damper housing 60 can be modified in various shapes as long as the first damper housing 60 is extended from the top of the first contact plate part 82 to the bottom of the damper part 30. The first damper housing 60 in accordance with the embodiment of the present disclosure includes a housing head 62, a first housing body 64 and a fixing body 66. The housing head 62 is located over the damper part 30, and has a larger outer diameter than the inner diameter of the damper part 30. The first housing body 64 is extended from the housing head 62 and positioned between the damper part 30 and the horn bolt part 40. The fixing body 66 is extended from the first housing body 64, and has a screw thread formed on the outside thereof such that the second damper housing 70 is fastened to the screw thread.

The first housing body 64 has a hollow portion in which the bolt body 44 is located. The first housing body 64 is formed in a pipe shape extended in the top-to-bottom direction, and the housing head 62 is connected to the top of the first housing body 64.

The housing head 62 is extended in an upward oblique direction from the top of the first housing body 64, and then extended in a horizontal direction. The housing head 62 has an inclined surface abutting on an inclined surface formed on the bottom of the head member 42 of the horn bolt part 40. The top of the housing head 62 does not abut on the bottom of the head member 42, and only the first contact plate part 82 abuts on the bottom of the head member 42.

The first housing body 64 is installed vertically through the inside of the inner member 33, and the fixing body 66 is connected to the bottom of the first housing body 64. The fixing body 66 is located on the bottom of the inner member 33, and the fixing body 66 has a screw thread formed on the outside thereof.

The second damper housing 70 can be modified in various shapes as long as the second damper housing 70 is located under the second contact plate part 90, and fastened to the first damper housing 60 and the bottom thereof is supported by the horn spring 100. The second damper housing 70 in accordance with the embodiment of the present disclosure includes a second housing body 72 and a support member 74. The second housing body 72 is fastened to the outside of the fixing body 66, and the support member 74 is extended outward from the second housing body 72, and supported by the horn spring 100.

The second damper housing 70 is located under the inner member 33, and screwed to the outside of the fixing body 66. Since the first and second damper housings 60 and 70 are easily separated and coupled, the maintenance cost can be reduced.

The second housing body 72 is installed in a shape to cover the outside of the fixing body 66, and installed in such a manner that the top thereof abuts on the inner member 33. The second contact plate part 90 is located on the top of the support member 74 protruding laterally from the second housing body 72, and the bottom of the support member 74 is supported by the horn spring 100.

The contact plate part 80 is installed between the damper housing 50 and the damper part 30 while abutting on the top and bottom of the damper part 30. The contact plate part 80 in accordance with the embodiment of the present disclosure includes the first contact plate part 82 and the second contact plate part 90.

The first contact plate part 82 is installed to abut on the top surface of the fixing protrusion 36 installed in the non-main vibration region (a) in the damper part 30, and the top of the first contact plate part 82 abuts on the head member 42 of the horn bolt part 40.

Therefore, the first contact plate part 82 may manage the distance between the head member 42 and the fixing protrusion 36. In order to increase the distance between the head member 42 and the fixing protrusion 36, the distance between the head member 42 and the fixing protrusion 36 is adjusted by increasing the size of the first contact plate part 82.

The second contact plate part 90 is installed to abut on the bottom surface of the fixing protrusion 36 installed in the non-main vibration region (a) in the damper part 30, and the body of the second contact plate part 90 is locked and supported by the second damper housing 70. Therefore, since the second contact plate part 90 abuts on the second damper housing 70 supported by the horn spring 100, horn tension caused by the horn spring 100 may be transferred to the damper part 30.

Since the contact plate part 80 is installed, the damper body 32 abuts on only the first damper housing 60 and does not abut on the other parts in the main vibration region (b) where the damper body 32 of the damper part 30 is located, which makes it possible to improve the durability of the damper part 30, and to prevent a change in natural frequency of the damper part 30.

The first damper housing 60 and the second damper housing 70 are fixed with the inner member 33 of the damper part 30 interposed therebetween, the first contact plate part 82 is installed between the damper part 30 and the first damper housing 60, and the second contact plate part 90 is installed between the damper part 30 and the second damper housing 70, thereby forming one buffer module.

The contact plate part 80 is coupled to the damper housing 50 in the top-to-bottom direction, but not engaged with the damper housing 50 in the rotation direction. Since the contact plate part 80 is not engaged with the damper housing 50 in the rotation direction, the contact plate part 80 is not rotated even though the damper housing 50 is rotated. Therefore, it is possible to prevent the contact surface of the damper part 30, on which the contact plate part 80 abuts, in a shear direction from being distorted in the rotation direction of the damper housing 50.

That is, since structures engaged with each other in the rotation direction are not provided between the damper housing 50 and the contact plate part 80, rotation doe not occur on the top and bottom shear surfaces of the damper part 30, even though the damper housing 50 is rotated by assembling and vibration.

Since the first contact plate part 82 is installed higher than the first damper housing 60, the first contact plate part 82 is brought into direct contact with the head member 42 of the horn bolt part 40. Therefore, it is possible to prevent operating noise generated by the interference between the first damper housing 60 and the first contact plate part 82, when the horn plate 10 is moved upward and downward to operate the horn.

The first contact plate part 82 includes a first body 83, a first inner protrusion 84 and a first contact protrusion 85. The first body 83 is installed between the top of the damper part 30 and the first damper housing 60, and supports the head member 42 of the horn bolt part 40. The first inner protrusion 84 protrudes laterally from the first body 83, and supports the first damper housing 60. The first contact protrusion 85 is extended downward from the first body 83 and abuts on the damper part 30.

The first body 83 is installed in a ring shape to cover the outside of the housing head 62, and the top of the first body 83 supports the bottom of the head member 42 of the horn bolt part 40. The first inner protrusion 84 protruding to the inside of the first body 83 supports the bottom of the housing head 62. When the first body 83 abuts on the bottom of the head member 42, the housing head 62 is separated from the head member 42.

The first contact protrusion 85 protruding from the bottom of the first body 83 is installed to abut on the top of the fixing protrusion 36 of the damper part 30. The first contact protrusion 85 can be modified in various shapes such as a ring shape, protrusion shape or elliptical protrusion shape.

As illustrated in FIG. 26, the first contact protrusion 85 protruding downward from the first contact plate part 82 is a ring-shaped protrusion. As illustrated in FIG. 27, a first contact protrusion 86 protruding downward from the first contact plate part 82 includes a plurality of protrusions formed in a circular arc direction along the first body 83. Alternatively, as illustrated in FIG. 28, a plurality of elliptical first contact protrusions 87 spaced apart from each other at preset angles may be installed in a circular arc direction along the first body 83.

The first contact protrusions 85 to 87 and the second contact protrusions 96 to 98 may be dot-shaped protrusions disposed in a radial shape or linear protrusions disposed in a ring shape. Therefore, the damper part 30 and the contact plate part 80 are brought into line or dot contact with each other each other.

The second contact plate part 90 can be modified in various shapes as long as the second contact plate part 90 is installed between the bottom of the damper part 30 and the second damper housing 70, and transfers the spring force of the horn spring 100 to the damper part 30. The second contact plate part 90 in accordance with the embodiment of the present disclosure includes a second body 92, a second inner protrusion 94 and the second contact protrusion 96. The second body 92 is located under the damper part 30. The second inner protrusion 94 protrudes laterally from the second body 92, and is supported by the horn spring 100. The second contact protrusion 96 is extended upward from the second body 92 and abuts on the damper part 30.

The second body 92 is installed in a ring shape to cover the second damper housing 70, and the bottom of the second inner protrusion 94 protruding to the inside of the second body 92 is supported by the support member 74 of the second damper housing 70. The second contact protrusion 96 protruding upward from the second body 92 is installed to abut on the bottom of the fixing protrusion 36. The second contact protrusion 96 can be modified in various shapes such as a ring shape, protrusion shape or elliptical protrusion shape.

As illustrated in FIG. 29, the second contact protrusion 96 protruding upward from the second contact plate part 90 is a ring-shaped protrusion. As illustrated in FIG. 30, the second contact protrusion 97 protruding upward from the second contact plate part 90 includes a plurality of protrusions protruding in a circular arc shape along the second body 92. Alternatively, as illustrated in FIG. 31, the plurality of elliptical second contact protrusions 98 spaced apart from each other at preset angles may be installed in a circular arc shape along the second body 92.

The horn spring 100 is installed on the top of the hub part 24 while supporting the second damper housing 70. When the horn is operated, the damper part 30 including the horn plate 10 is moved downward, and the horn plate 10 from which an outer pressing force has been removed is moved upward by a restoring force of the horn spring 100.

The horn plate 10 moved in the top-to-bottom direction has a first contact 110, and the hub part 24 facing the first contact 110 has a second contact 115. Therefore, since the first contact 110 is brought into contact with the second contact 115 by the movement of the horn plate 10 in the top-to-bottom direction, the horn is operated.

In the damper structure of the steering wheel 1 for a vehicle, the non-main vibration region (a) includes the fixing protrusion 36, the first body 83 located on the top of the fixing protrusion 36, and the second body 92 located under the fixing protrusion 36.

In the damper structure of the steering wheel 1 for a vehicle, the main vibration region (b) includes the damper body 32 and the second damper housing 70. Since less vibration is applied to the non-main vibration region (a) than the main vibration region (b), the non-main vibration region (a) is vibrated less than the main vibration region (b).

Hereafter, the operation state of the steering wheel 1 for a vehicle in accordance with the embodiment of the present disclosure will be described in detail with reference to the accompanying drawings.

In order to operate the horn by pressing the top of the hub part 24 of the steering wheel 1 for a vehicle, the horn plate 10 is moved downward to bring the first contact 110 into contact with the second contact 115. Then, the horn is operated. The horn spring 100 is compressed by the downward movement of the horn plate 10, and the horn spring 100 is returned to the initial shape and moves the horn plate 10 upward, as an external force is removed.

When the horn plate 10 is moved upward and downward, the damper part 30, the damper housing 50 and the contact plate part 80 are moved upward and downward along the horn bolt part 40 while forming one buffer module.

When the vehicle is driven or stopped, vibration transferred to the hub part 24 is absorbed by the damper body 32, and the parts other than the damper housing 50 are not brought into contact with the damper body 32, thereby preventing a change in natural frequency of the damper part 30.

Vibration transferred to the hub part 24 is transferred from the horn bolt part 40 to the damper housing 50, and transferred to the fixing protrusion 36 through the contact plate part 80 abutting on the damper housing 50, such that the damper part 30 and the contact plate part 80 are brought into contact with each other in the non-main vibration region (a). Therefore, since the natural frequency of the damper part 30 can be maintained in comparison to the buffer structure in which the contact plate part 80 is brought into contact with the damper body 32, the operation reliability is improved.

Since structures engaged with each other in the rotation direction are not provided between the damper housing 50 and the contact plate part 80, it is possible to prevent distortion in the damper part 30 by the rotation operations of neighboring parts.

According to the shapes and numbers of the first and second contact protrusions 85 and 96 abutting on the damper part 30, the resonant frequency of the damper part 30 in a Z-direction (top-to-bottom direction based on FIG. 24) may be adjusted. For example, when the target resonant frequency of the damper part 30 is high, the first and second contact protrusions 85 and 96 may be elongated in a line shape, or the numbers of the first and second contact protrusions 85 and 96 may be increased. When the target resonant frequency of the damper part 30 is low, the first and second contact protrusions 85 and 96 may be formed in a dot shape, and the numbers of the first and second contact protrusions 85 and 96 may be reduced.

When vibration occurs, the fixing protrusion 36 of the damper part 30 may prevent the rotation of the damper body 32 such that the damper part 30 has effective damping performance, and cause the damper body 32 to be continuously fixed to the horn plate 10. When the damper body 32 is rotated, the shape of the damper body 32 may be distorted, and continuous stress causes damage to the damper body 32.

As described above, since only the first and second contact protrusions 85 and 96 abut the top and bottom of the damper part 30, respectively, the contacts between the damper part 30 and the neighboring parts at the top and bottom thereof can be minimized to improve the durability of the damper part 30. The damper part 30 is not brought into contact with the contact plate part 80 in the main vibration region (b) of the damper part 30, but brought into contact with the contact plate part 80 only in the non-main vibration region (a). Therefore, it is possible to prevent a change in natural frequency of the damper part 30. Furthermore, since the rotation of the damper housing 50 is not transferred to the contact plate part 80, distortion in the damper part 30 may be prevented to improve the durability of the damper part 30. Furthermore, since the contact plate part 80 abuts on the head member 42 of the horn bolt part 40 before the damper housing 50, noise can be reduced.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A steering wheel for a vehicle, comprising:
a damper part installed in a connection hole of a horn plate, and formed of an elastic material;
a horn bolt part fixed to a hub part through the damper part, and configured to guide movement of the horn plate;
a damper housing located between the damper part and the horn bolt part, and moved with the damper part; and
a horn spring configured to support the damper housing, and having elasticity,
wherein the horn bolt part comprises:
a head member located on a top of the horn plate,
a bolt body extended from the head member through an inside of the damper housing, and
a fastening body extended from the bolt body and fixed to the hub part,
wherein the damper housing comprises:
a first damper housing extended from the top of the horn plate to a bottom of the damper part, and
a second damper housing located under the damper part, fastened to the first damper housing, and supported by the horn spring,
wherein the first damper housing comprises:
a housing head located between the damper part and the head member,
a first housing body extended from the housing head, and located between the damper part and the bolt body, and a fixing body extended from the first housing body, and having a screw thread formed on an outside thereof such that the second damper housing is fastened to the screw thread.

2. The steering wheel of claim 1, wherein the damper part comprises:
an inner member installed in a ring shape while abutting on the inside of the damper housing;
an outer member located outside the inner member, and installed in a shape to cover the horn plate; and
a connection member configured to connect the inner member and the outer member.

3. The steering wheel of claim 1, wherein the top of the housing head supports the head member, and the bottom of the housing head abuts on the damper part.

4. The steering wheel of claim 1, wherein the second damper housing comprises:
a second housing body fastened to the outside of the fixing body; and
a support member extended outward from the second housing body, and supported by the horn spring.

5. The steering wheel of claim 4, wherein the first damper housing further comprises a release prevention protrusion protruding from a bottom surface of the fixing body, facing the second housing body, and inserted and locked into the second housing body.

6. A steering wheel for a vehicle, comprising:
a damper part installed in a connection hole of a horn plate, and form of an elastic material;
a horn bolt part fixed to a hub part through the damper part, and configured to guide movement of the horn plate;
a first damper housing located between the damper part and the horn bolt part, and extended from a top of the horn plate to a bottom of the damper part;
a second damper housing located under the damper part, fastened to the first damper housing, and supported by a horn spring; and
the horn spring configured to support the second damper housing, and having elasticity,
wherein the first damper housing comprises:
a housing head located between the damper part and a head member of the horn bolt part,
a first housing body extended from the housing head, and located between the damper part and the horn bolt part,
a fixing body extended from the first housing body, and having a screw thread formed on an outside thereof such that the second damper housing is fastened to the screw thread, and
a release prevention protrusion protruding from a bottom surface of the fixing body, and inserted and locked into the second damper housing.

7. A steering wheel for a vehicle, comprising:
a damper part installed in a connection hole of a horn plate, and formed of an elastic material;
a horn bolt part fixed to a hub part through the damper part, and configured to guide movement of the horn plate;
a damper housing located between the damper part and the horn bolt part, and moved with the damper part; and
a contact plate part installed between the damper housing and the damper part.

8. The steering wheel of claim 7, wherein the damper part comprises:
an inner member installed in a ring shape while abutting on the inside of the damper housing;
an outer member located outside the inner member, and installed in a shape to cover the horn plate; and
a connection member configured to connect the inner member and the outer member.

9. The steering wheel of claim 8, wherein the damper part further comprises a fixing protrusion extended from the outer member and inserted and locked into a fixing hole of the horn plate.

10. The steering wheel of claim 7, wherein the horn bolt part comprises:
a head member located on the top of the horn plate;
a bolt body extended from the head member through the inside of the damper housing; and
a fastening body extended from the bolt body and fixed to the hub part.

11. The steering wheel of claim 7, wherein the damper housing comprises:
a first damper housing extended from the top of the horn plate to the bottom of the damper part; and
a second damper housing located under the damper part, fastened to the first damper housing, and supported by a horn spring.

12. A steering wheel for a vehicle, comprising:
a damper part installed in a connection hole of a horn plate, and formed of an elastic material;
a horn bolt part fixed to a hub part through the damper part, and configured to guide movement of the horn plate;
a damper housing located between the damper part and the horn bolt part, and moved with the damper part;
a first contact plate part comprising a first inner protrusion disposed between the damper part and the damper housing; and
a second contact plate part comprising a second inner protrusion disposed between the damper part and the damper housing.

13. The steering wheel of claim 12, wherein the damper part comprises:
a damper body installed in such a shape that the inside thereof abuts on the damper housing and the outside thereof covers the horn plate; and
a fixing protrusion extended from the damper body, and inserted and locked into a fixing hole of the horn plate, such that the first and second contact plate parts abut on the outside thereof.

14. A steering wheel for a vehicle, comprising:
a damper part installed in a connection hole of a horn plate, and formed of an elastic material;
a horn bolt part fixed to a hub part through the damper part, and configured to guide movement of the horn plate;
a first damper housing located between the damper part and the horn bolt part, and extended from the top of the horn plate to the bottom of the damper part;
a second damper housing located under the damper part, fastened to the first damper housing, and supported by a horn spring;
a first contact plate part comprising a first inner protrusion disposed between the damper part and the first damper housing; and
a second contact plate part comprising a second inner protrusion disposed between the damper part and the second damper housing.

15. The steering wheel of claim 14, wherein the damper part comprises:

a damper body installed in such a shape that the inside thereof abuts on the first damper housing and the outside thereof covers the horn plate; and a fixing protrusion extended from the damper body, and inserted and locked into a fixing hole of the horn plate, such that the first and second contact plate parts abut on the outside thereof.

16. The steering wheel of claim 14, wherein the horn bolt part comprises:

a head member located on the top of the horn plate;

a bolt body extended from the head member through the inside of the first damper housing; and a fastening body extended from the bolt body and fixed to the hub part.

\* \* \* \* \*